United States Patent
Kim et al.

(10) Patent No.: US 7,916,984 B2
(45) Date of Patent: Mar. 29, 2011

(54) OPTO-ELECTRIC BUS MODULE AND METHOD OF MANUFACTURING THE SAME

(75) Inventors: Jin Tae Kim, Daejeon (KR); Suntak Park, Daejeon (KR); Jung Jin Ju, Daejeon (KR); Seung Koo Park, Daejeon (KR); Min-Su Kim, Daejeon (KR); Myung Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 393 days.

(21) Appl. No.: 12/049,261

(22) Filed: Mar. 14, 2008

(65) Prior Publication Data

US 2008/0226222 A1    Sep. 18, 2008

(30) Foreign Application Priority Data

Mar. 16, 2007  (KR) .................. 10-2007-0026190
Mar. 13, 2008  (KR) .................. 10-2008-0023177

(51) Int. Cl.
*G02B 6/12* (2006.01)
(52) U.S. Cl. .......................... 385/14; 385/129
(58) Field of Classification Search .................. 385/14, 385/129
See application file for complete search history.

(56) References Cited

U.S. PATENT DOCUMENTS 6,483,967 B2 * 11/2002 Tang et al. ...................... 385/43
7,038,235 B2 *  5/2006 Seitz ................................ 257/40
7,684,663 B2 *  3/2010 Deane ............................. 385/14

FOREIGN PATENT DOCUMENTS

KR   2004-0102481 A   12/2004
KR   2005-0070263 A    7/2005

* cited by examiner

*Primary Examiner* — Jennifer Doan
(74) *Attorney, Agent, or Firm* — Rabin & Berdo, P.C.

(57) ABSTRACT

Provided are an opto-electric bus module and a method of manufacturing the opto-electric bus module. The opto-electric bus module includes an opto-electric interconnection unit where a concave-shaped micro structure is formed on a lower surface of a polymer structure and an optical bench where a convex-shaped micro structure is formed in a position corresponding to the concave-shaped micro structure, at least one second electric interconnection for electric connection with a semiconductor chip is formed, and the semiconductor chip and an opto-electric device can be mounted. Thus, automatic, efficient, high-speed, and high-integration optical communication and electric communication between multi-chips can be completed at the same time by using the opto-bus module which provides low-speed electric communication while manually maintaining solid optical coupling.

19 Claims, 32 Drawing Sheets

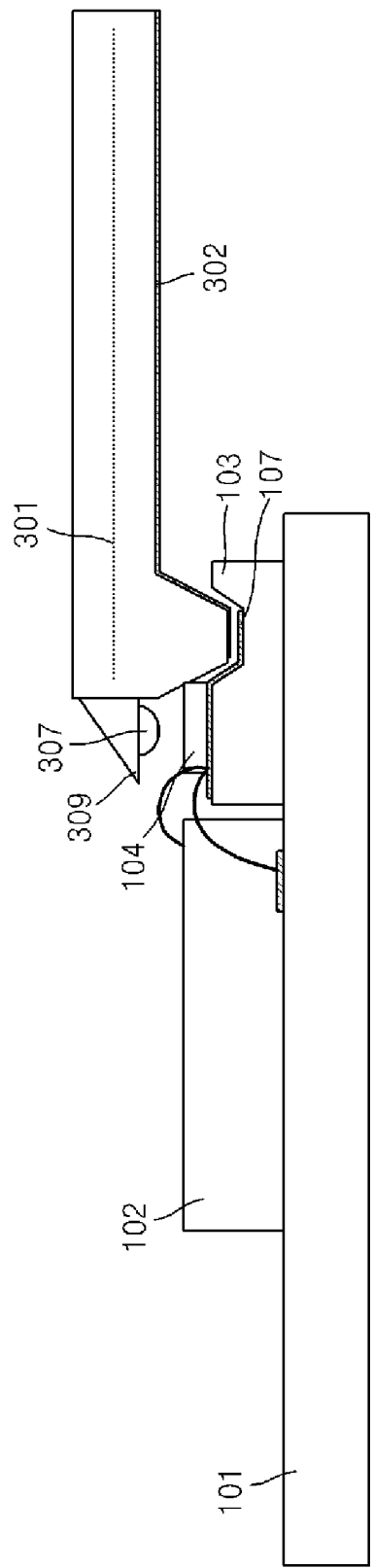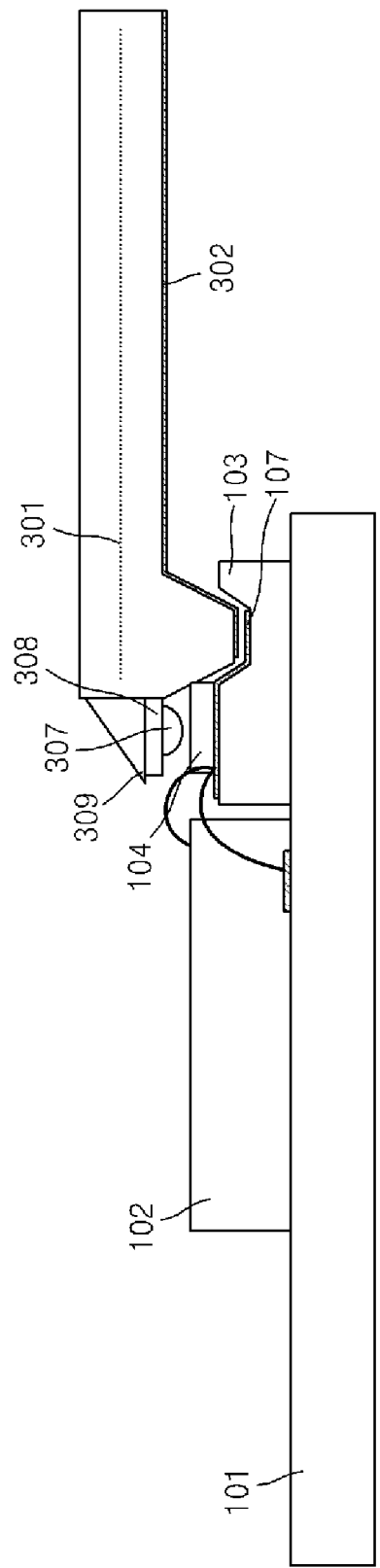

UV TRANSPARENT POLYMER

MAINTAIN THICKNESS OF UPPER CLAD CONSTANT

MAINTAIN THICKNESS OF UPPER CLAD CONSTANT

OPTO-ELECTRIC BUS MODULE AND METHOD OF MANUFACTURING THE SAME

CROSS-REFERENCE TO RELATED PATENT APPLICATION

This application claims the benefit of Korean Patent Application No. 10-2007-0026190, filed on Mar. 16, 2007, in the Korean Intellectual Property Office, the disclosure of which is incorporated herein in its entirety by reference.

BACKGROUND OF THE INVENTION

1. Field of the Invention

The present invention generally relates to an opto-electric bus module and a method of manufacturing the same, and more particularly, to an opto-electric bus module which simultaneously provides optical communication and electric communication between semiconductor chips, and a method of manufacturing the opto-electric bus module.

This work was supported by IT R&D program of MIC/IITA[2006-S-073-01, Nano flexible opto-electric PCB module for portable display].

2. Description of the Related Art

The development of technologies for semiconductor devices embedded in portable information communication devices requires information transmission techniques for transmitting mass information to monitors, hard disks, memories, and the like at high speeds.

Moreover, recent potable terminals such as cellular phones require techniques for high-speed interconnection between semiconductor chips in order to process still image and moving image information as well as conventional voice information at high speeds.

With advances in technologies, there have emerged optical interconnection techniques capable of overcoming limitations, such as signal integrity, crosstalk, and electromagnetic interference (EMI) of conventional electric conducting wires, for high-speed interconnection between semiconductor chips and there have been developed optical communication structures and methods between semiconductor chips by using various optical connectors.

However, traditional parallel optical interconnection techniques using optical connectors require removable optical connectors techniques in which sophisticated and solid optical coupling between an opto-electric device (light emitting device or light receiving device) and an optical fiber can be freely established and can then be released if necessary.

The removable optical connectors are highly likely to undergo twist of optical alignment between an opto-electric device and an optical fiber due to repetitive removal, resulting in degradation of optical coupling efficiency.

Moreover, the degradation of optical coupling efficiency may cause a loss of continuously transmitted information or a problem in transmission.

Although solid optical connectors for sophisticated and solid optical alignment between an opto-electric device and an optical fiber have been developed, they increase the overall size of the optical connectors. Such a size increase may cause the inappropriate use of the space of the entire optical communication module and system using the optical connectors.

Recently, communication between semiconductor chips requires conventional low-speed electric communication as well as conventional high-speed optical communication, and electric communication between semiconductor chips using conventional printed circuit boards (PCBs) cannot guarantee sufficient miniaturization because the thickness and space of the PCBs have to be considered in order to respond to transmission length increase and semiconductor chip miniaturization.

SUMMARY OF THE INVENTION

The present invention provides an opto-electric bus module which is simple and solid and simultaneously provides optical communication and electric communication between semiconductor chips and a method of manufacturing the opto-electric bus module.

According to an aspect of the present invention, there is provided an opto-electric bus module including an opto-electric interconnection unit where an optical waveguide is formed and at least one of a concave-shaped micro structure and a convex-shaped micro structure is formed on a lower surface of a structure into which at least one first electric interconnection line is inserted, and an optical bench where a convex-shaped micro structure or a concave-shaped micro structure is formed in a position corresponding to the micro structure formed in the opto-electric interconnection unit, an opto-electric device for performing optical communication through the optical waveguide is mounted, and at least one second electric interconnection for electric connection to a semiconductor chip is formed.

According to another aspect of the present invention, there is provided a method of manufacturing an opto-electric interconnection unit. The method includes forming a lower clad by coating ultraviolet (UV) hardened polymer onto a substrate and hardening the substrate with UV rays, and forming an optical waveguide and an electric interconnection on the resulting upper clad, forming an upper clad by coating UV hardened polymer onto the lower clad, pressing an UV permeable mold having a convex-shaped micro structure formed therein onto the upper clad, and hardening the resulting upper clad with UV rays, and separating the mold from the upper clad.

According to another aspect of the present invention, there is provided a method of manufacturing an opto-electric interconnection unit. The method includes forming a lower clad by coating ultraviolet (UV) hardened polymer onto a substrate and hardening the substrate with UV rays, and forming an optical waveguide on the resulting upper clad, forming an upper clad by coating UV hardened polymer onto the lower clad, pressing an UV permeable mold having a concave-shaped micro structure formed therein onto the upper clad, and hardening the resulting upper clad with UV rays, separating the mold from the upper clad, and forming an electric interconnection on the upper clad.

BRIEF DESCRIPTION OF THE DRAWINGS

The above and other features and advantages of the present invention will become more apparent by describing in detail embodiments thereof with reference to the attached drawings in which:

FIGS. 15A through 15D illustrate examples for improving the efficiency of optical coupling of the opto-electric bus module according to another embodiment of the present invention;

DETAILED DESCRIPTION OF THE INVENTION

Figure 1:
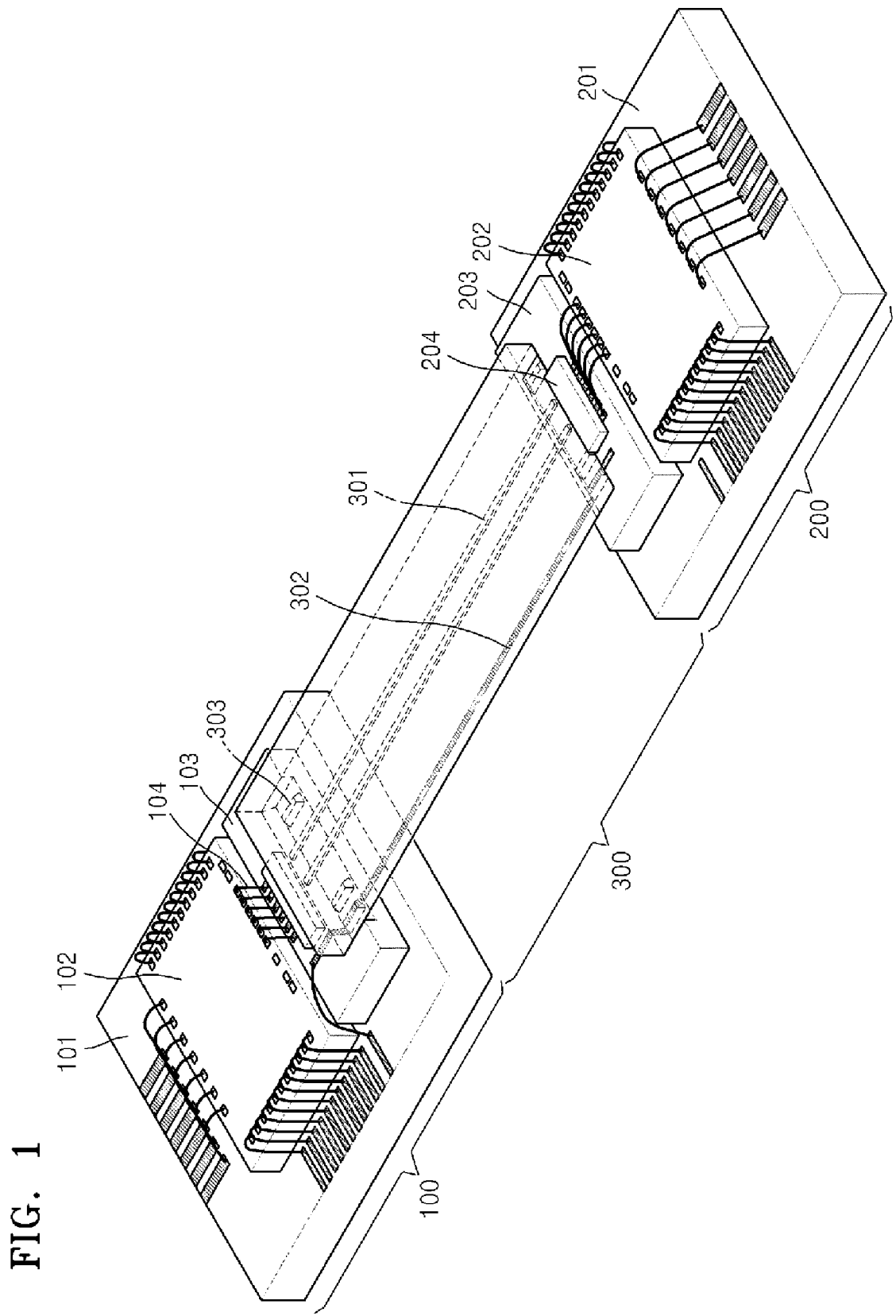
FIG. 1 illustrates the structure of an opto-electric bus module according to an embodiment of the present invention.

Hereinafter, embodiments of the present invention will be described in detail with reference to the accompanying drawings. It should be noted that like reference numerals refer to like elements illustrated in one or more of the drawings. In the following description of the present invention, detailed description of known functions and configurations incorporated herein will be omitted for conciseness and clarity.

FIG. 1 illustrates a structure of an opto-electric bus module according to an embodiment of the present invention.

Referring to FIG. 1, the opto-electric bus module includes an opto-electric transmission unit 100, an opto-electric reception unit 200, and an opto-electric interconnection unit 300.

The opto-electric transmission unit 100 includes a printed circuit board (PCB) 101, an opto-electric device drive 102, an optical bench 103, and a light emitting device 104 formed on the optical bench 103. A convex-shaped micro structure is formed on a optical bench 103 and an electric interconnection is formed on an upper surface of a portion of the convex-shaped micro structure and on the optical bench 103.

The opto-electric reception unit 200 includes a PCB 201, an opto-electric device amp 202, an optical bench 203, and a light receiving device 204 formed on the optical bench 203. A convex-shaped micro structure is formed on the optical bench 203 and an electric interconnection is formed on a lower surface of a portion of the convex-shaped micro structure 206 and on the optical bench 203. In other words, the shapes of the opto-electric transmission unit 100 and the opto-electric reception unit 200 are symmetrical to each other.

The opto-electric interconnection unit 300 includes an optical waveguide 301, an electric interconnection 302, and a concave-shaped micro structure 303. The electric interconnection 302 is formed open on the lower surface of a portion of the concave-shaped micro structure 303.

Figure 2A:
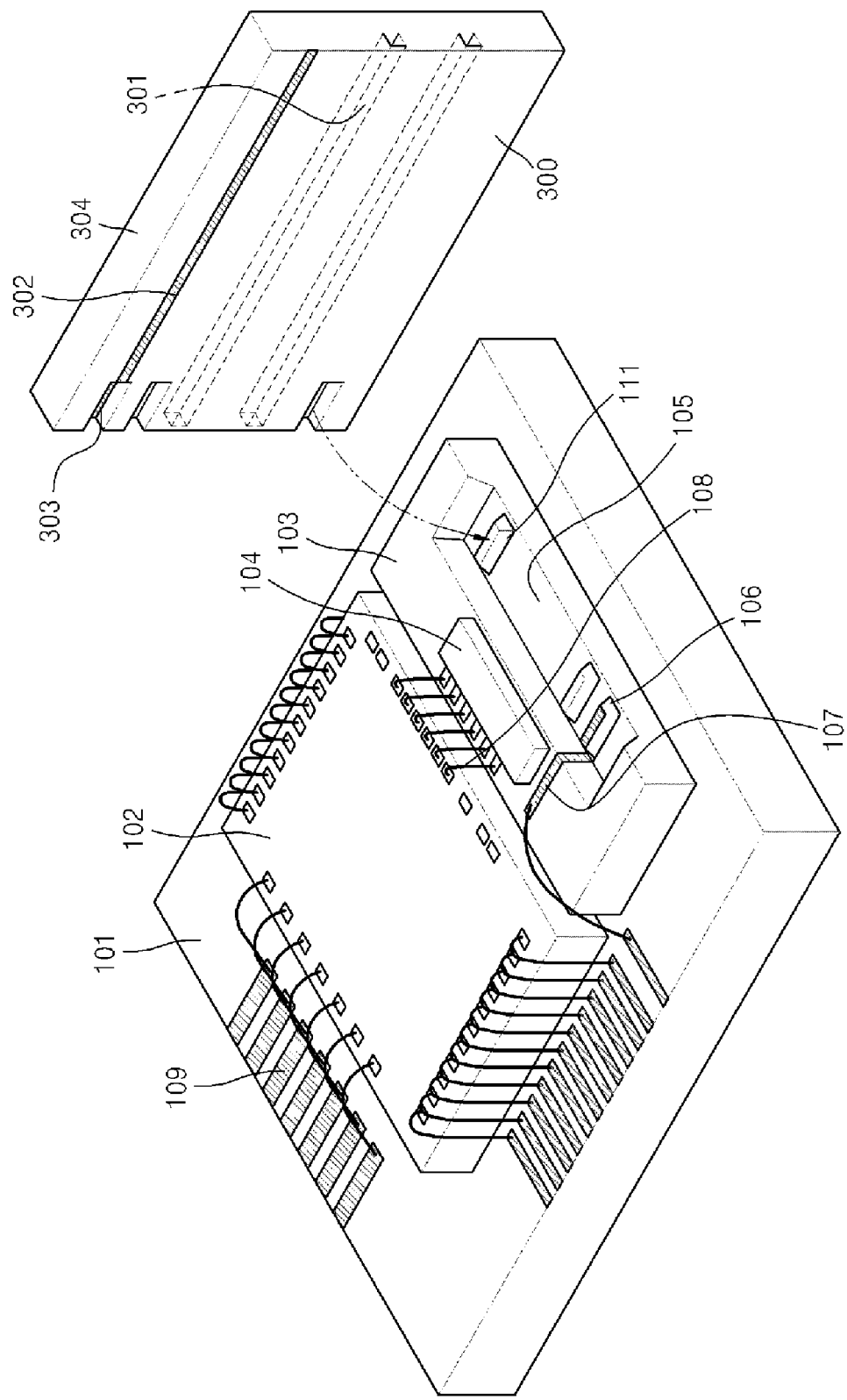
FIGS. 2A through 2C illustrate in detail an opto-electric transmission unit of the opto-electric bus module according to an embodiment of the present invention.
Figure 2B:
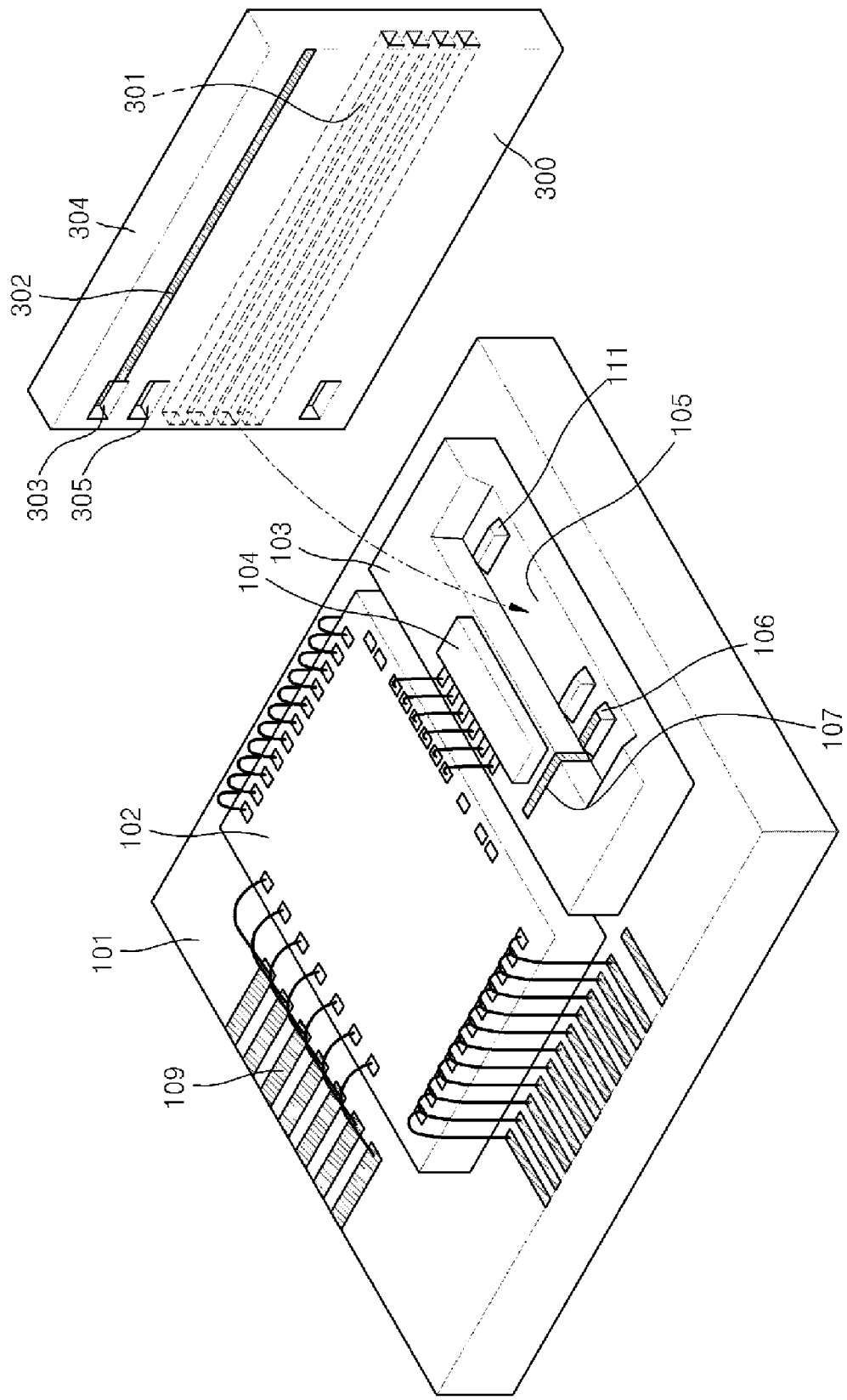
Figure 2C:
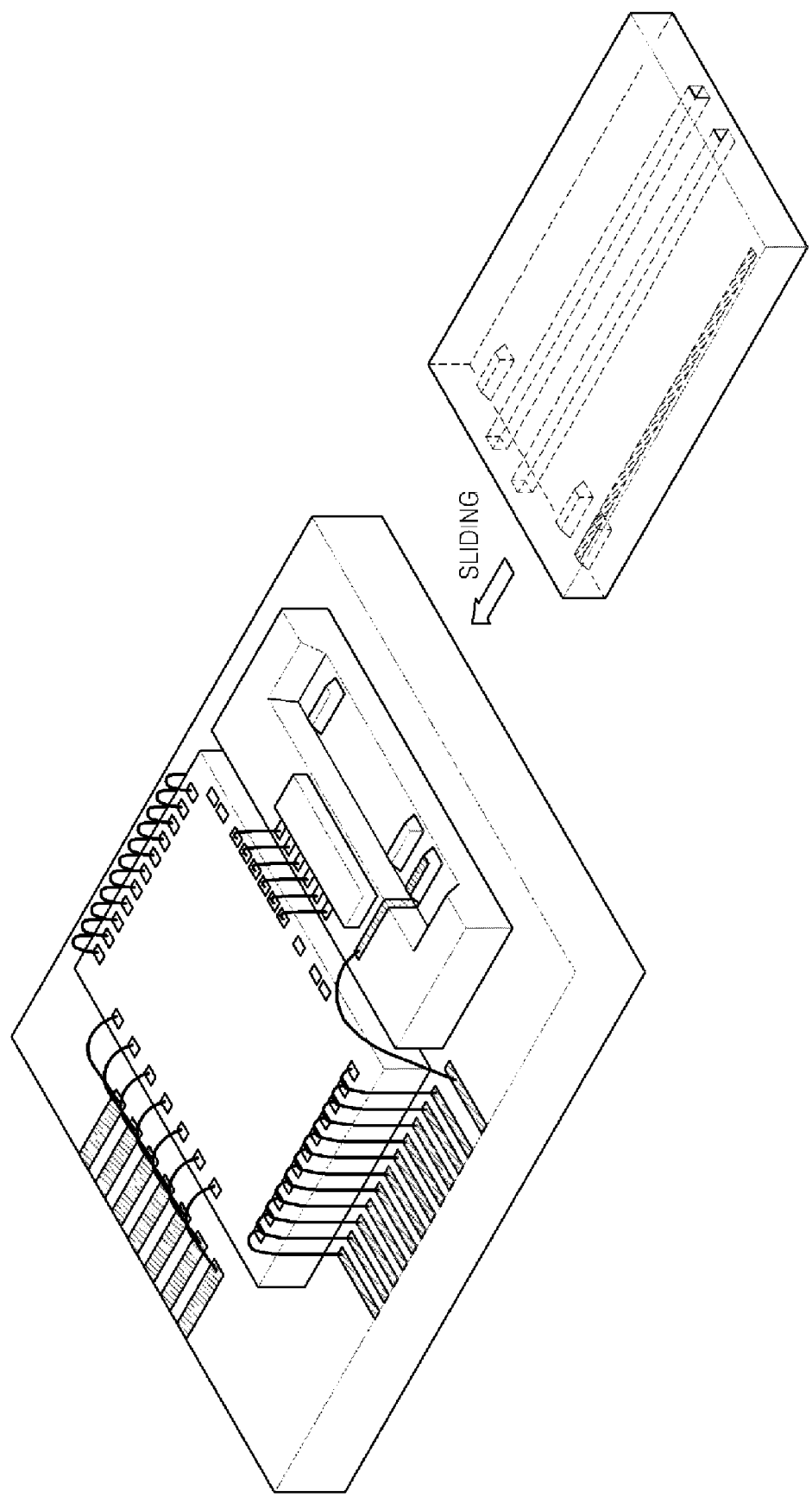

FIGS. 2A through 2C illustrate in detail the opto-electric transmission unit 100 of the opto-electric bus module according to an embodiment of the present invention.

Referring to FIGS. 2A and 2B, the opto-electric interconnection unit 300 may include the optical waveguide 301 inserted into a flexible polymer structure, the electric interconnection 302, and the concave-shaped micro structure 303. An end of the electric interconnection 302 is opened on the lower surface of the concave-shaped micro structure 303.

The opto-electric transmission unit 100 includes the opto-electric device drive 102 and the optical bench 103 mounted on the PCB 101. An opto-electric device 104 and a large concave 105 are formed in the optical bench 103. The convex-shaped micro structure 106 is formed on the large concave 105 and the electric interconnection 107 formed on the convex-shaped micro structure 106 extends to the upper surface of the optical bench 103.

Three types of electric interconnections, i.e., the electric interconnection 107 for electric communication, an electric interconnection 108 for an optical device, and an integrated electric interconnection 109 are formed.

The opto-electric device 104 is a light emitting device or a light receiving device. An end of the electric interconnection 107 extends to the upper surface of the convex-shaped micro structure 106.

The concave-shaped micro structure 303 formed on the opto-electric interconnection unit 300 is perpendicularly inserted into the convex-shaped micro structure 106 formed on the optical bench 103 of the opto-electric transmission unit 100 by using flip-chip coupling, so that the opto-electric device 104 and the optical waveguide 301 are automatically optical-coupled to each other vertically/horizontally.

At this time, since the electric interconnection 107 is formed on the upper surface of the portion of the convex-shaped micro structure 106 on the optical bench 103 and the electric interconnection 302 is formed on the lower surface of the portion of the concave-shaped micro structure 303 of the opto-electric interconnection unit 300, two electric interconnections 107, 302 are also automatically electric-coupled to each other.

Referring to FIG. 2B, the concave-shaped micro structure 303 of the opto-electric interconnection unit 300 and the convex-shaped micro structure 106 on the optical bench 103 are formed in pyramid shape in order to apply vertical flip-chip coupling to coupling between the concave-shaped micro structure 303 and the convex-shaped micro structure 106.

Referring to FIG. 2C, instead of applying vertical flip-chip coupling to coupling between the concave-shaped micro structure 303 and the convex-shaped micro structure 106 formed in pyramid shape as illustrated in FIG. 2B, the concave-shaped micro structure 303 of the opto-electric interconnection unit 300 and the convex-shaped micro structure 106 on the optical bench 103 may be formed in square pole in order to allow the opto-electric interconnection unit 300 to be coupled with the optical bench 103 by sliding horizontally along the optical bench 103. According to such a design, an optical alignment distance between the optical waveguide 301 and the opto-electric device 104 can be easily adjusted.

FIGS. 3A through 3E illustrate optical coupling and electric coupling of the opto-electric bus module according to another embodiment of the present invention.

Figure 3A:
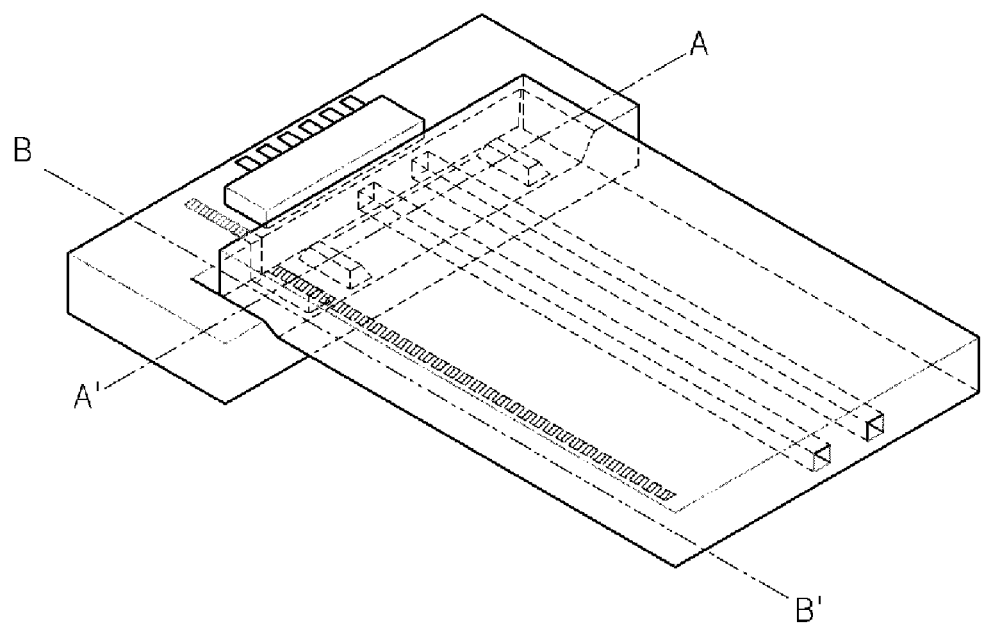
FIGS. 3A through 3E illustrate optical coupling and electric coupling of the opto-electric bus module according to another embodiment of the present invention.

In FIG. 3A, the opto-electric interconnection unit 300 and the optical bench 103 of the opto-electric transmission unit 100 are opto-electric-coupled to each other. As described with reference to FIGS. 2A through 2C, the concave-shaped micro structure 303 of the opto-electric interconnection unit 300 is connected with the convex-shaped micro structure 106 on the optical bench 103, thereby simultaneously forming optical alignment and electric connection.

Figure 3B:
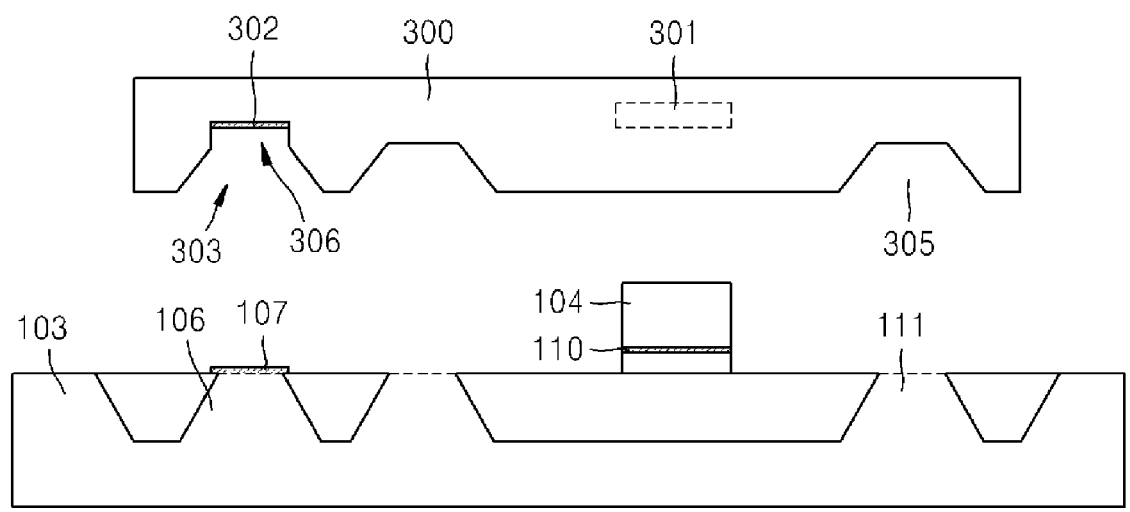
Figure 3C:
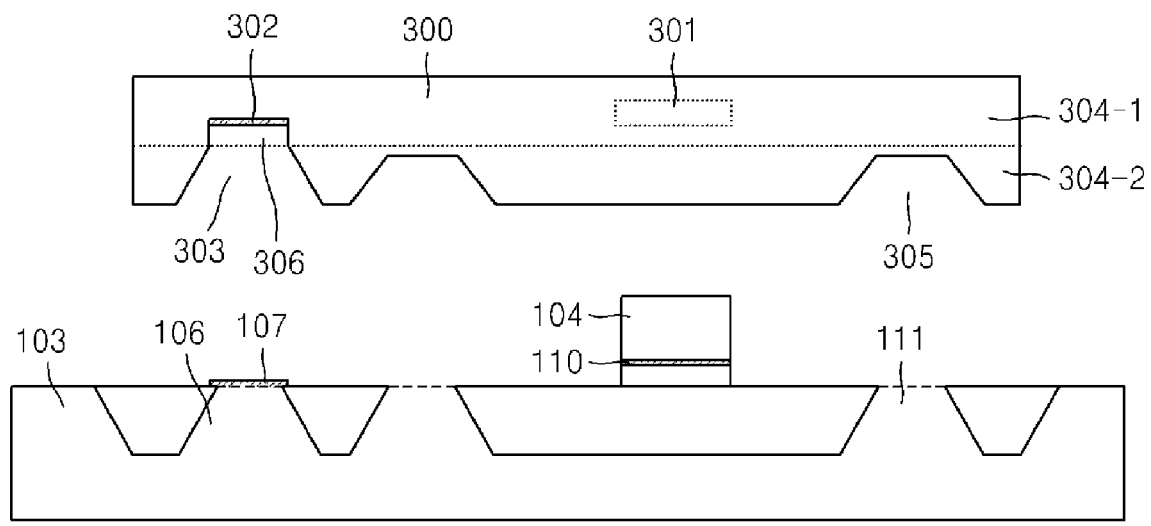

FIGS. 3B and 3C illustrate a cross section taken along a line A-A' of FIG. 3A.

Referring to FIG. 3B, the concave-shaped micro structure 303 of the opto-electric interconnection unit 300 includes the concave-shaped micro structure 303 (hereinafter, referred to as a first concave-shaped micro structure) where the electric interconnection 302 is formed and a concave-shaped micro structure 305 (hereinafter, referred to as a second concave-shaped micro structure) where the electric interconnection 302 is not formed.

The convex-shaped micro structure 106 on the optical bench 103 of the opto-electric transmission unit 100 also includes the convex-shaped micro structure 106 (hereinafter, referred to as a first convex-shaped micro structure) where the electric interconnection 107 is formed and a convex-shaped micro structure 111 (hereinafter, referred to as a second convex-shaped micro structure) where the electric interconnection 107 is not formed.

The optical waveguide 301 may be formed between the first concave-shaped micro structure 303 and the second concave-shaped micro structure 305 of the opto-electric interconnection unit 300.

A concave surface of the first concave-shaped micro structure 303 may include the electric interconnection 302 and a space 306 for insertion of the electric interconnection 107 formed on a convex surface of the first convex-shaped micro structure 106. The horizontal positions of the optical waveguide 301 and the electric interconnection 302 may be the same or not the same as each other.

Referring to FIG. 3C, the first concave-shaped micro structure 303 is connected to the first convex-shaped micro structure 106 and the second concave-shaped micro structure 305 is connected to the second convex-shaped micro structure 111.

The second concave-shaped micro structure 305 formed on the opto-electric interconnection unit 300 and the second convex-shaped micro structure 111 formed on the optical bench 103 of the opto-electric transmission unit 100 are coupled to each other, thereby completing automatic, vertical and horizontal optical alignments between the opto-electric device 104 and the optical waveguide 301.

Moreover, the electric interconnection 107 formed on the convex surface of the first convex-shaped micro structure 106 on the optical bench 103 and the electric interconnection 302 formed on the concave surface of the first concave-shaped micro structure 303 are electrically connected to each other, thereby simultaneously completing optical coupling and electric connection between the opto-electric interconnection unit 300 and the opto-electric transmission unit 100.

The second concave-shaped micro structure 305 and the second convex-shaped micro structure 111 are used for vertical and horizontal optical alignment between the optical waveguide unit 301 of the opto-electric interconnection unit 300 and the opto-electric device 104.

By adjusting the heights of the second convex-shaped micro structure 111 and the second concave-shaped micro structure 305, the height of the optical waveguide unit 301 of the opto-electric interconnection unit 300 placed on the optical bench 103 can be adjusted. Moreover, by adjusting the positions of the second concave-shaped micro structure 305 and the second convex-shaped micro structure 111, the horizontal position of the optical waveguide unit 301 of the opto-electric interconnection unit 300 placed on the optical bench 103 can be adjusted.

Coupling between the first concave-shaped micro structure 303 and the first convex-shaped micro structure 106 forms electric connection between the electric interconnection 302 formed on the concave surface and the electric interconnection 107 formed on the convex surface.

The electric interconnection 107 formed on the first convex-shaped micro structure 106 has some thickness. Thus, a step between the optical waveguide 301 and the opto-electric device 104 may be changed during coupling between the opto-electric interconnection unit 300 and the optical bench 103. To prevent such a change, the first concave-shaped micro structure 303 includes the space 306 into which the electric interconnection 107 of the first convex-shaped micro structure 106 is inserted.

In other words, when the opto-electric interconnection unit 300 is coupled to the optical bench 103, the space 306 accommodates the electric interconnection 107, thereby maintaining the step between the optical waveguide 301 and the opto-electric device 104, which is formed during coupling between the second concave-shaped micro structure 304 and the second convex-shaped micro structure 111, constant and thus preventing change of optical coupling efficiency.

Moreover, the opto-electric interconnection unit 300 includes two layers, i.e., an upper clad 304-2 and a lower clad 304-1. The concave surface of the second concave-shaped micro structure 305 where the electric interconnection 302 is not formed is located in a surface where the two clad layers meet. Micro structures corresponding to micro structures formed in the upper clad 304-2 of the opto-electric interconnection unit 300 are formed in the optical bench 103.

Figure 3D:
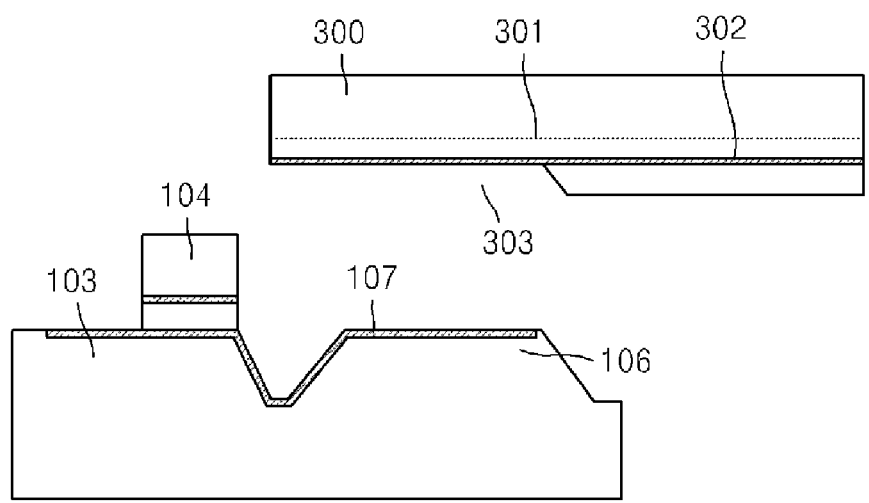
Figure 3E:
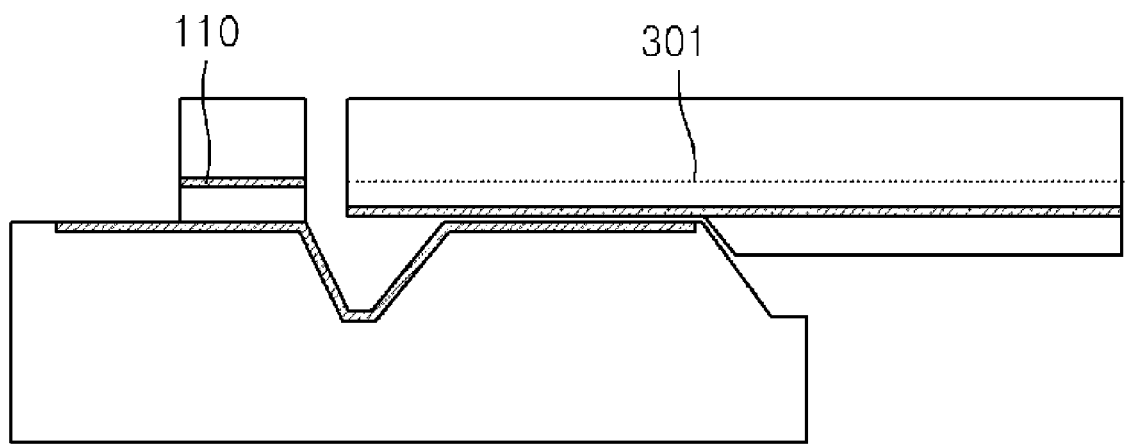
Figure 3F:
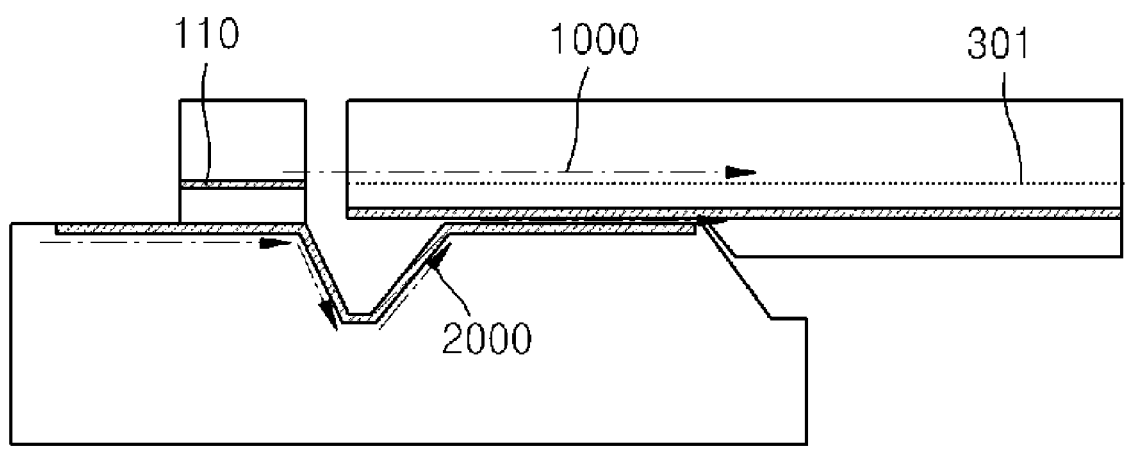

FIGS. 3D through 3F illustrate a cross-section taken along a line B-B' of FIG. 3A.

Referring to FIGS. 3D through 3F, the first concave-shaped micro structure 303 formed on the opto-electric interconnection unit 300 is inserted into the first convex-shaped micro structure 106 of the optical bench 103 of the opto-electric transmission unit 100, thereby completing automatic, vertical optical-coupling between an active region 110 of the opto-electric device 104 and the optical waveguide 301.

During optical coupling, the electric interconnection 107 formed on a convex surface of the first convex-shaped micro structure 106 of the optical bench 103 and the electric interconnection 302 formed on a concave surface of the first concave-shaped micro structure 303 of the opto-electric interconnection unit 300 are connected to each other.

Referring to FIG. 3F, an optical signal 1000 generated by the opto-electric device 104 is directly delivered to the optical waveguide 301 formed on the opto-electric interconnection unit 300 in order to travel towards the opto-electric reception unit 200 of FIG. 1.

An electric signal 2000 generated by a semiconductor chip of the opto-electric transmission unit 100 is delivered to the electric interconnection 107 of the first convex-shaped micro structure 106 and then continues traveling along the electric interconnection 302 formed in the first concave-shaped micro structure 303 towards the opto-electric reception unit 200 of FIG. 1.

Figure 4A:
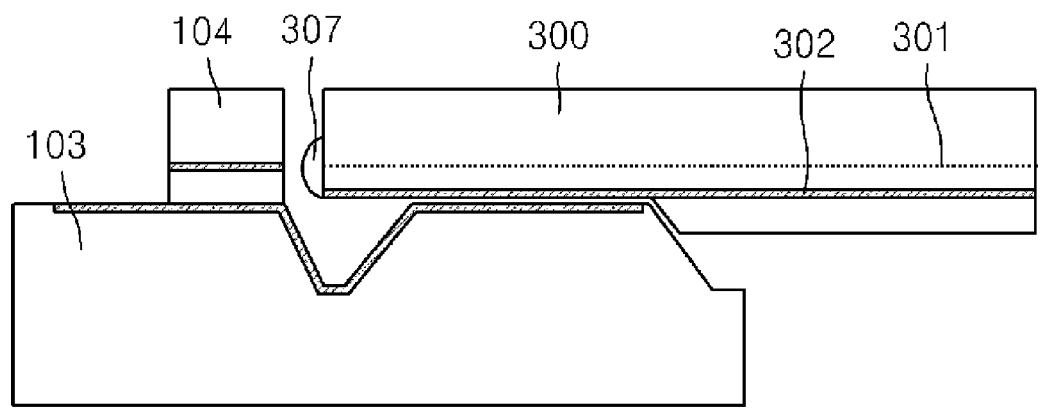
FIGS. 4A and 4B illustrate examples for improving optical coupling efficiency of the opto-electric bus module according to another embodiment of the present invention.
Figure 4B:
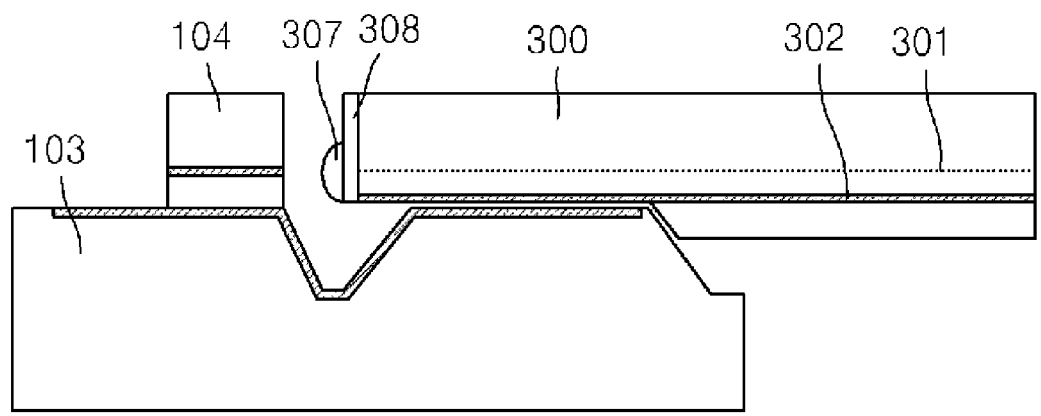

FIGS. 4A and 4B illustrate examples for improving the efficiency of optical coupling of the opto-electric bus module according to another embodiment of the present invention.

In FIG. 4A, the opto-electric device 104 supplies a collected light source through a lens 307 included in the opto-electric interconnection unit 300 to the optical waveguide 301, thereby providing high-efficiency optical coupling.

In FIG. 4B, the opto-electric interconnection unit 300 further includes the lens 307 and a polarizer 308. For excitation of surface plasmon polariton that theoretically describes optical transmission of a metal optical waveguide, light in a transverse magnetic (TM) mode has to be incident.

If light generated by a light emitting device, e.g., a vertical cavity surface emitting laser (VCSEL), does not has the TM mode or has only a TE mode, TE-mode light generated by the light emitting device is converted into TM-mode light and thus the TM-mode light required for excitation of the surface plasmon polariton of the optical waveguide can be incident by using the polarizer 308.

Figure 5:
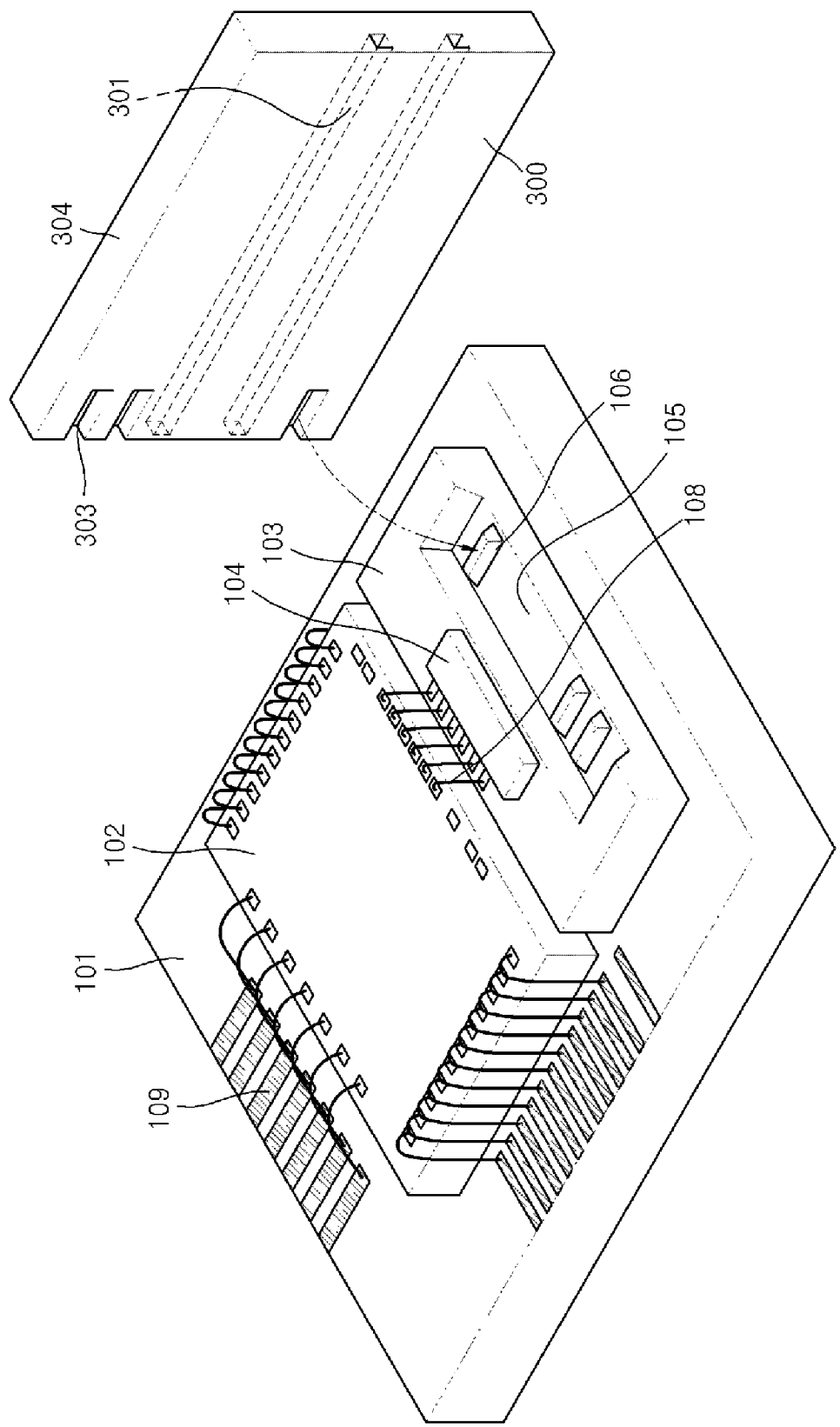
FIG. 5 illustrates the structure of an opto-electric bus module according to another embodiment of the present invention.

FIG. 5 illustrates the structure of an opto-electric bus module according to another embodiment of the present invention.

The opto-electric bus module illustrated in FIG. 5 includes all components illustrated in and described with reference to FIGS. 2A through 3F. However, the electric interconnection is not formed in the first convex-shaped micro structure 106 formed on the optical bench 103 of an opto-electric transmission/reception unit 100 or 200. In addition, the electric interconnection is not formed in the first concave-shaped micro structure 303 of the opto-electric interconnection unit 300.

Thus, only vertical and horizontal optical alignments between the opto-electric device 104 and the optical waveguide 301 are completed by coupling between the convex-shaped micro structure 106 on the optical bench 103 and the concave-shaped micro structure 303 of the opto-electric interconnection unit 300. At this time, the concave-shaped micro structure 303 of the opto-electric interconnection unit 300 and the convex-shaped micro structure 106 formed on the optical bench 103 may be formed in pyramid shape in order to be coupled with each other as illustrated in FIG. 2B.

FIGS. 6A through 6D illustrate the structure of an opto-electric bus module according to another embodiment of the present invention.

Figure 6A:
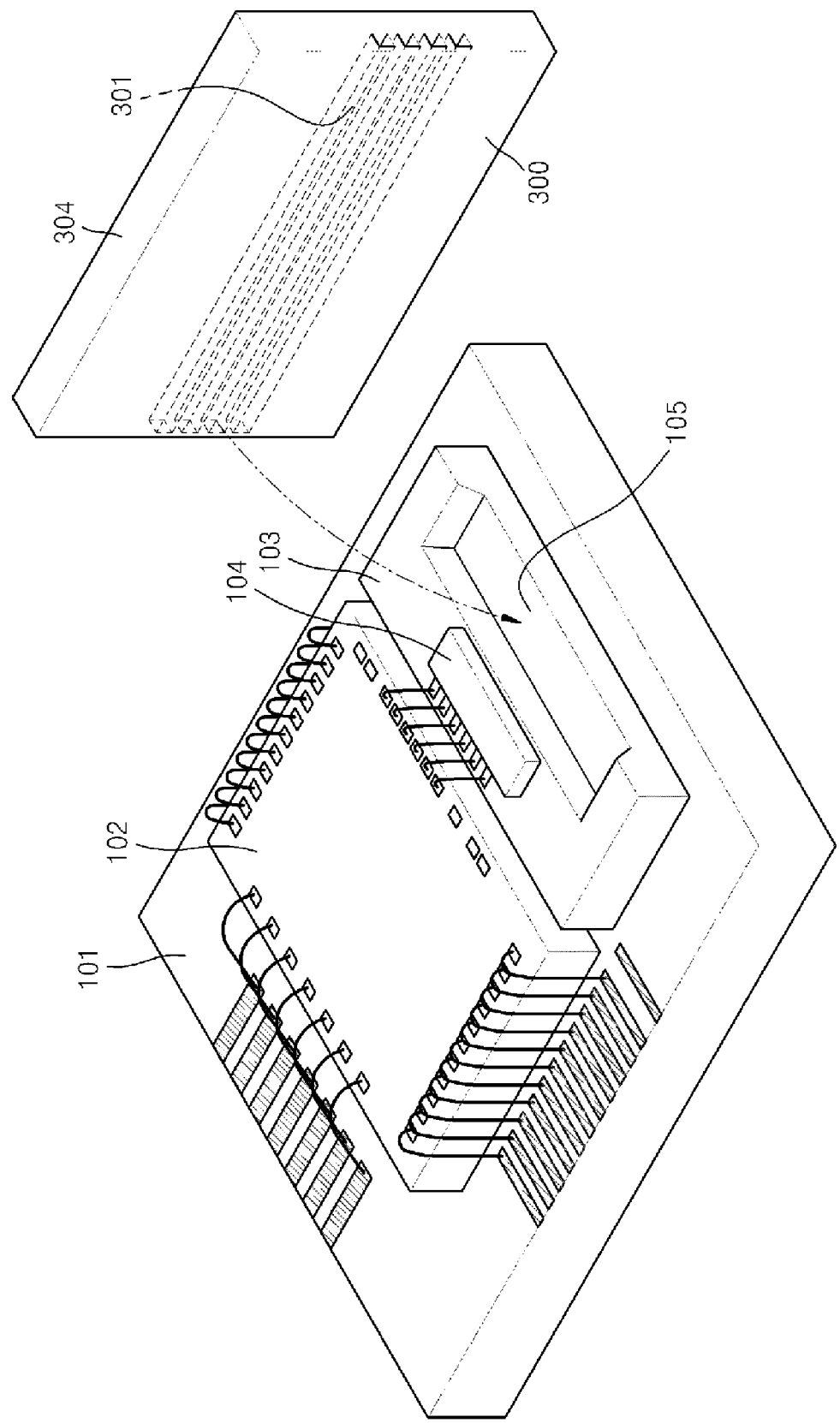
FIGS. 6A through 6D illustrate the structure of an opto-electric bus module according to another embodiment of the present invention.

Referring to FIG. 6A, the opto-electric transmission/reception unit 100 or 200 includes the opto-electric drive 102 and the optical bench 103 mounted on the PCB 101. In the optical bench 103, the opto-electric device 104 and the large concave 105 are formed. The opto-electric device 104 is a light emitting device or a light receiving device. The optical waveguide 301 is formed in the opto-electric interconnection unit 300.

Figure 6B:
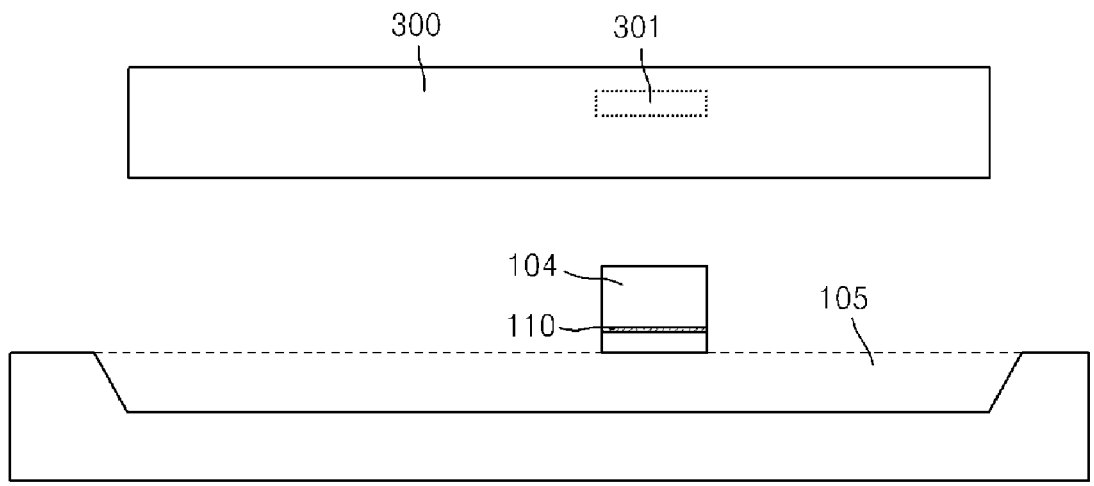
Figure 6C:
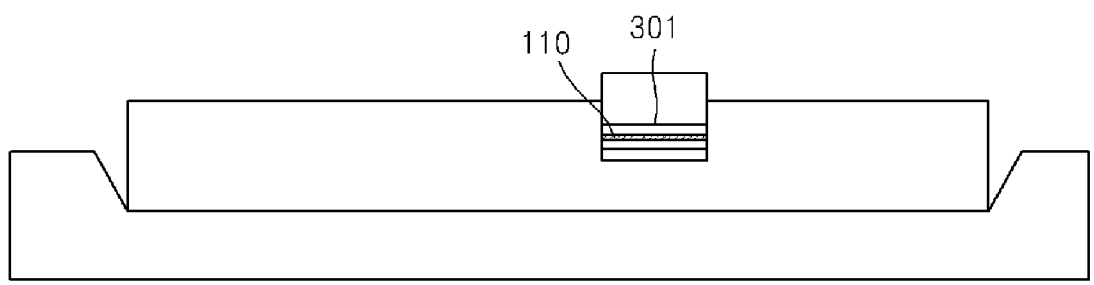
Figure 6D:
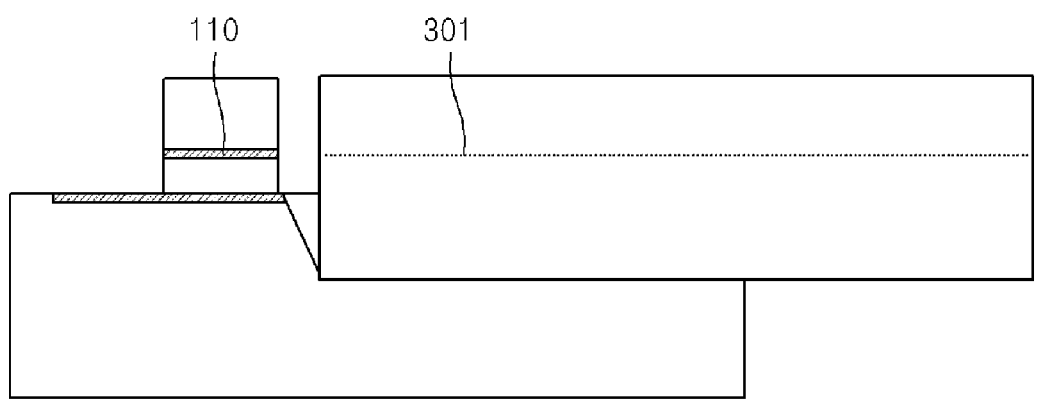

Referring to FIGS. 6B through 6D, the opto-electric interconnection unit 300 is inserted into the large concave 105 of the optical bench 103, thereby completing optical alignment between the active region 110 of the opto-electric device 104 and the optical waveguide 301. At this time, by adjusting the height and width of the opto-electric interconnection unit 300, the precision of the optical alignment between the active region 110 of the opto-electric device 104 and the optical waveguide 301 can be adjusted.

Figure 7A:
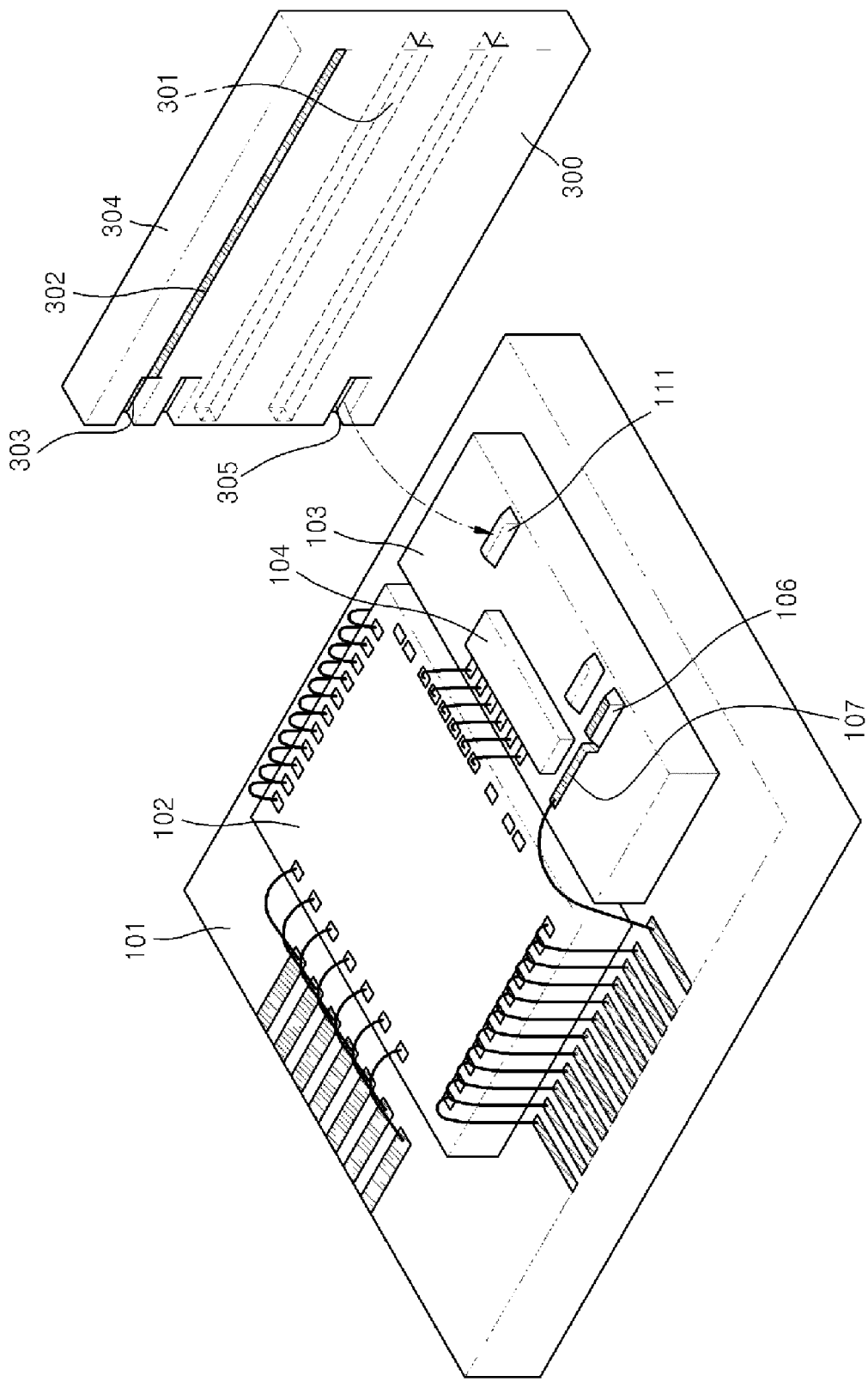
FIGS. 7A and 7B illustrate the structure of an opto-electric bus module according to another embodiment of the present invention.
Figure 7B:
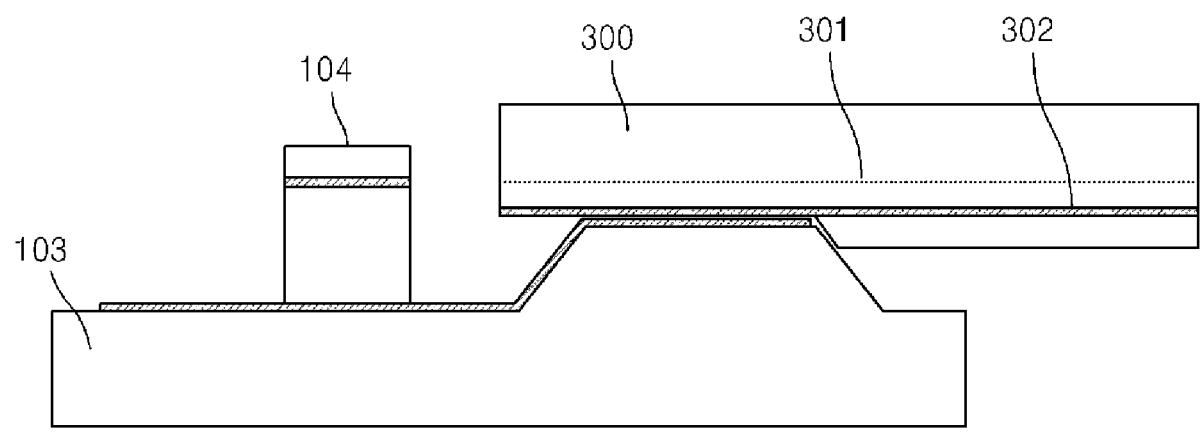

FIGS. 7A and 7B illustrate the structure of an opto-electric bus module according to another embodiment of the present invention.

The opto-electric bus module illustrated in FIGS. 7A and 7B include all components illustrated in and described with reference to FIGS. 2A through 3F. However, the large concave 105 is not formed in the optical bench 103 of the opto-electric transmission/reception unit 100 or 200.

The concave-shaped micro structure 305 formed in the opto-electric interconnection unit 300 and the convex-shaped micro structure 111 formed on the optical bench 103 are coupled with each other, thereby completing automatic, horizontal and vertical optical alignments between the opto-electric device 104 and the optical waveguide unit 301.

The electric interconnection 107 formed on the convex surface of the convex-shaped micro structure 106 formed on the optical bench 103 and the electric interconnection 302 formed on the concave surface of the concave-shaped micro structure 303 of the opto-electric interconnection unit 300 are automatically electric-coupled, thereby simultaneously completing electric connection and optical coupling between the opto-electric interconnection unit 300 and the opto-electric transmission unit 100. The principle of optical coupling and electric coupling between the opto-electric interconnection unit 300 and the opto-electric transmission/reception unit 100 or 200 is as illustrated in FIG. 7B.

Figure 8A:
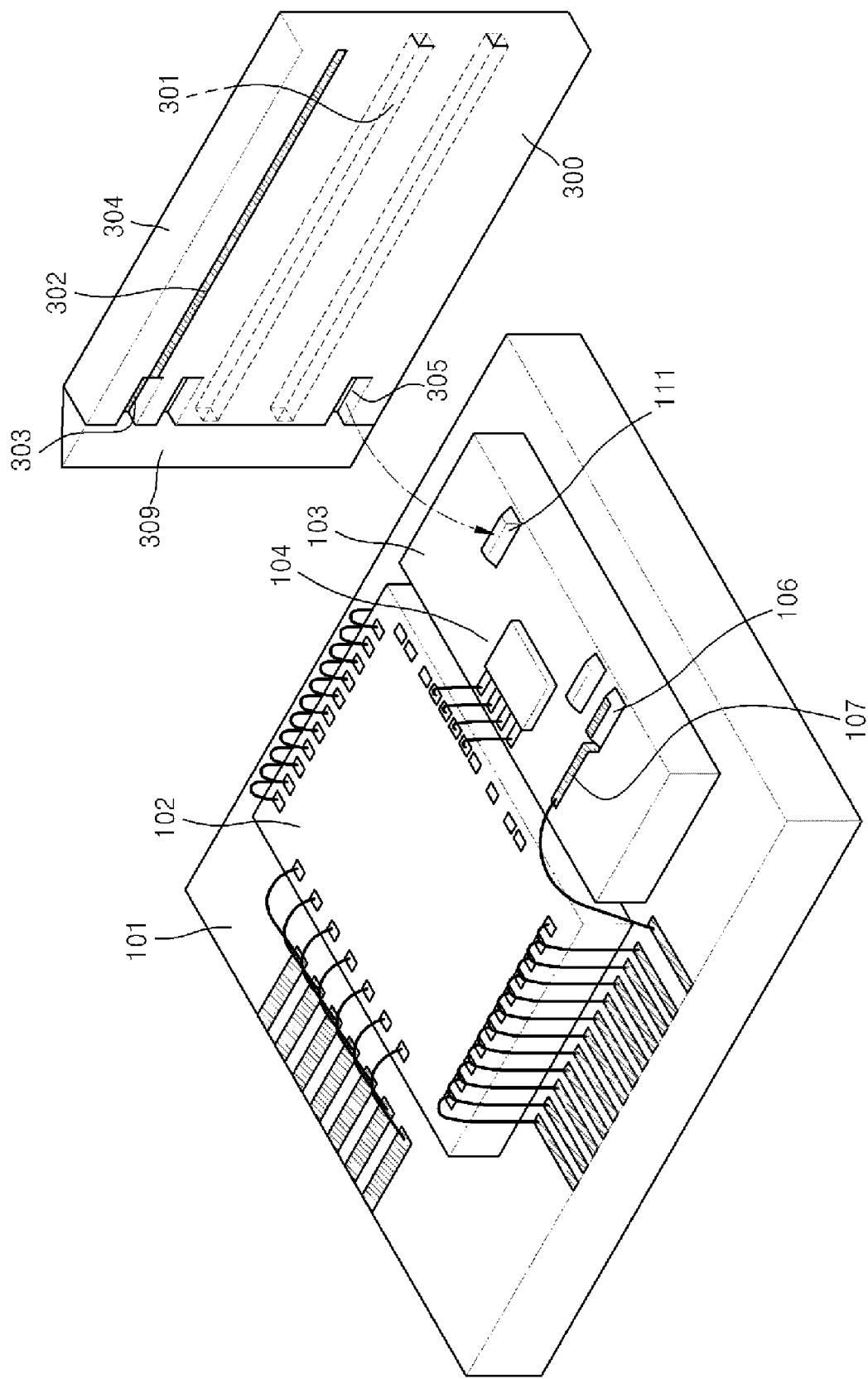
FIGS. 8A and 8B illustrate the structure of an opto-electric bus module according to another embodiment of the present invention.
Figure 8B:
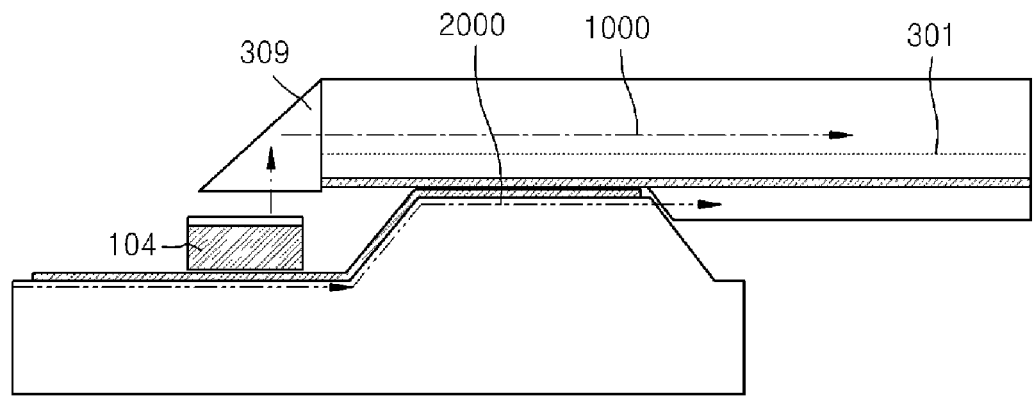

FIGS. 8A and 8B illustrate the structure of an opto-electric bus module according to another embodiment of the present invention.

The opto-electric bus module illustrated in FIGS. 8A and 8B includes all components illustrated in and described with reference to FIGS. 2A through 3F. However, the large concave 105 is not formed in the optical bench 103 of the opto-electric transmission/reception unit 100 or 200 and a cross-section of the optical waveguide 301 of the opto-electric interconnection unit 300 further includes a 45°-reflective mirror 309. This opto-electric bus module can be applied to the use of a VCSEL or a photo diode (PD) which vertically emits or receives light.

The principle of optical coupling and electric coupling between the opto-electric interconnection unit 300 and the opto-electric transmission/reception unit 100 or 200 is as illustrated in FIG. 8B.

Figure 9A:
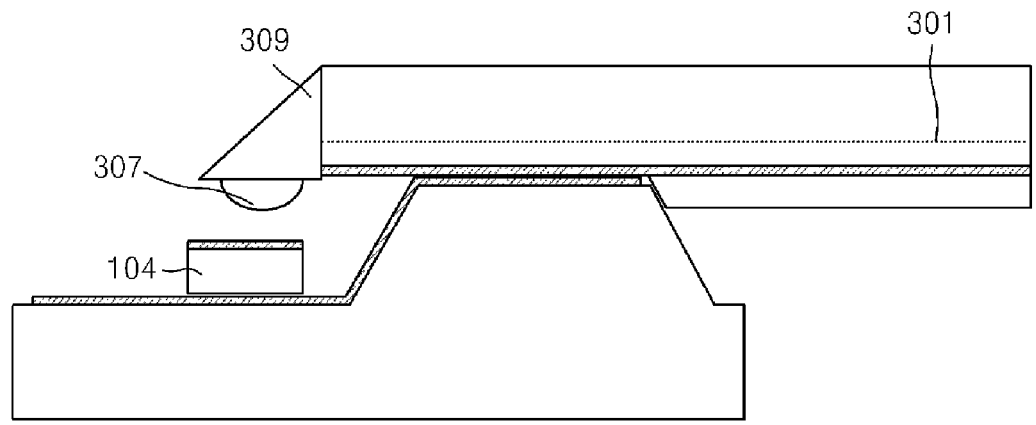
FIGS. 9A and 9B illustrate examples for improving the efficiency of optical coupling of an opto-electric bus module according to another embodiment of the present invention.
Figure 9B:
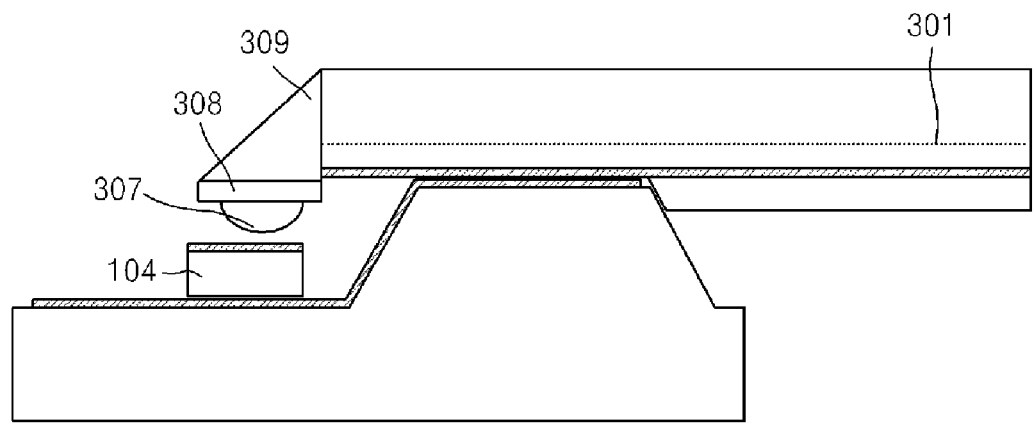

FIGS. 9A and 9B illustrate examples for improving the efficiency of optical coupling of an opto-electric bus module according to another embodiment of the present invention.

In FIG. 9A, the opto-electric device 104 supplies a collected light source through the lens 307 included in the opto-electric interconnection unit 300 to the optical waveguide 301, thereby providing high-efficiency optical coupling.

In FIG. 9B, the opto-electric interconnection unit 300 further includes the lens 307 and the polarizer 308. For excitation of surface plasmon polariton that theoretically describes optical transmission of a metal optical waveguide, light in a TM mode has to be incident.

If light generated by a light emitting device, e.g., a VCSEL, does not has the TM mode or has only a TE mode, TE-mode light generated by the light emitting device is converted into TM-mode light and thus the TM-mode light required for excitation of the surface plasmon polariton of the optical waveguide can be incident by using the polarizer 308.

Figure 10:
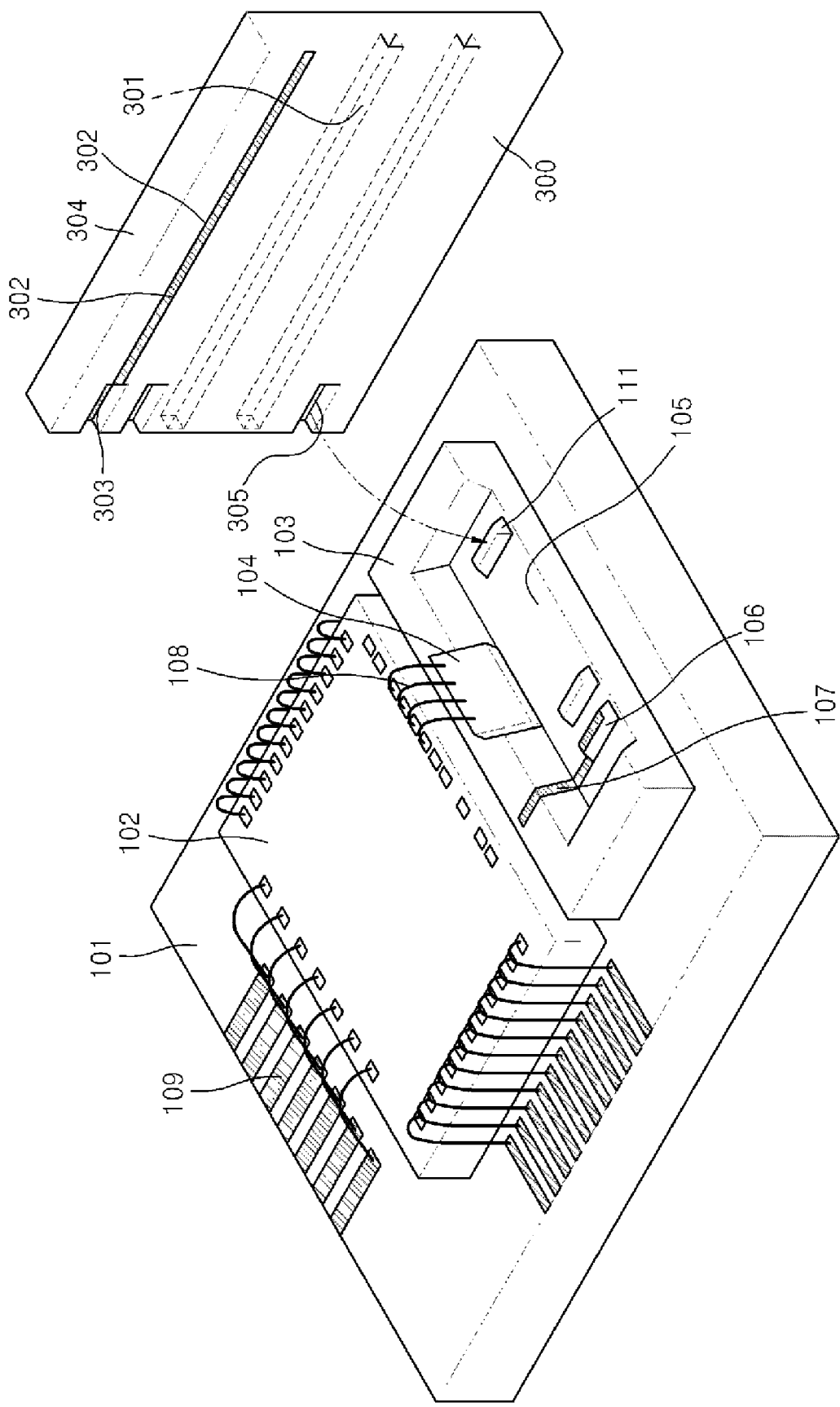
FIG. 10 illustrates the structure of an opto-electric bus module according to another embodiment of the present invention.

FIG. 10 illustrates the structure of an opto-electric bus module according to another embodiment of the present invention.

Referring to FIG. 10, the opto-electric interconnection unit 300 includes the optical waveguide 301 inserted into the flexible polymer structure 304, the electric interconnection 302, the first concave-shaped micro structure 303 where the electric interconnection 302 is formed, and the second concave-shaped micro structure 305 where the electric interconnection 302 is not formed. An end of the electric interconnection 302 is opened on the concave surface of the first concave-shaped micro structure 303.

The opto-electric transmission/reception unit 100 or 200 includes the opto-electric device drive 102 and the optical bench 103 mounted on the PCB 101. The opto-electric device 104 and the large concave 105 are formed in the optical bench 103, and the first convex-shaped micro structure 106 where the electric connection 107 is formed and the second convex-shaped micro structure 111 where the electric connection 107 is not formed are formed in the large concave 105. An end of the electric interconnection 107 extends to the upper surface of the first convex-shaped micro structure 106 formed on the optical bench 103. The opto-electric device 104 is a light emitting device or a light receiving device and is located on an inclined wall surface of the large concave 105. The inclination of the wall surface ranges between 0° and 90°.

Three types of electric interconnections, i.e., the electric interconnection 107 for electric communication, the electric interconnection 108 for an optical device, and the integrated electric interconnection 109 are formed.

Figure 11A:
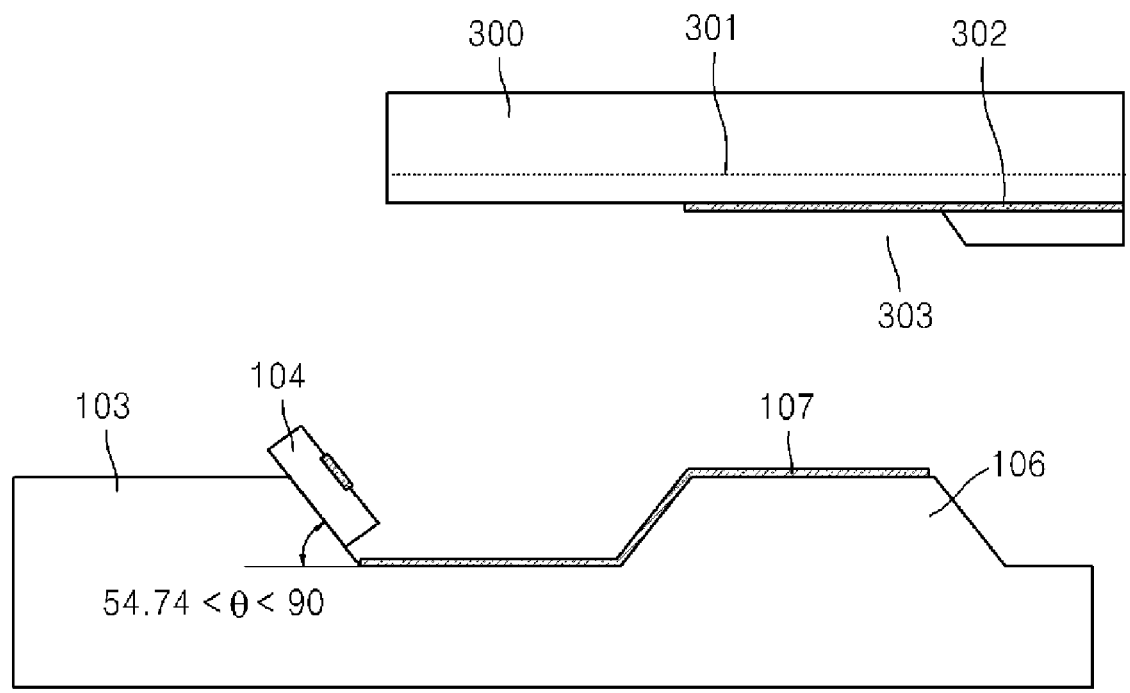
FIGS. 11A and 11B illustrate optical coupling and electric coupling of the opto-electric bus module according to another embodiment of the present invention.
Figure 11B:
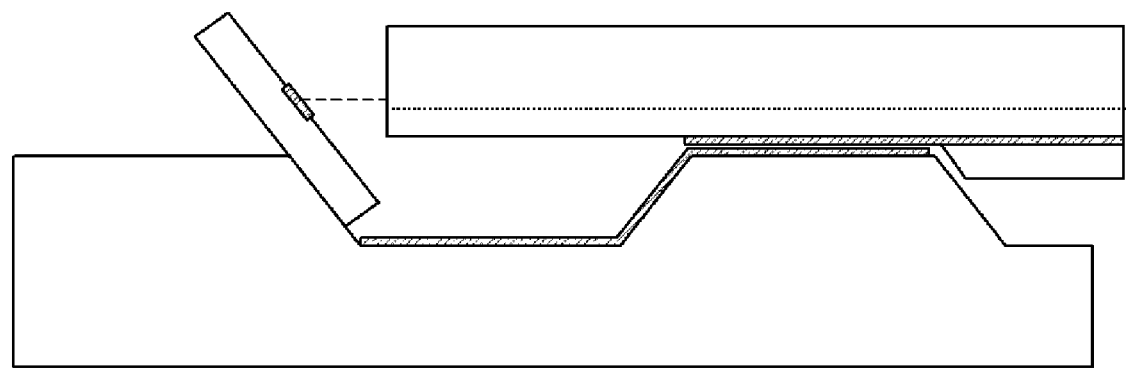

FIGS. 11A and 11B illustrate optical coupling and electric coupling of the opto-electric bus module according to another embodiment of the present invention.

In FIG. 11A, the opto-electric interconnection unit 300 and the optical bench 103 of the opto-electric transmission/reception unit 100 or 200 are opto-electrically coupled. As described with reference to FIGS. 2A through 2C, the concave-shaped micro structure 303 of the opto-electric interconnection unit 300 is connected to the convex-shaped micro structure 106 on the optical bench 103, thereby simultaneously completing optical alignment and electric connection.

As illustrated in and described with reference to FIGS. 3A through 3F, the first concave-shaped micro structure 303 is connected to the first convex-shaped micro structure 106 and the second concave-shaped micro structure 305 is connected to the second convex-shaped micro structure 111.

Automatic, vertical and horizontal optical alignments between the opto-electric device 104 and the optical waveguide unit 301 are completed by coupling between the second concave-shaped micro structure 305 formed in the opto-electric interconnection unit 300 and the second convex-shaped micro structure 111 formed on the optical bench 103 of the opto-electric transmission unit 100.

In addition, the electric interconnection 107 formed the convex surface of the convex-shaped micro structure 106 formed on the optical bench 103 and the electric interconnection 302 formed on the concave surface of the concave-shaped micro structure 303 of the opto-electric interconnection unit 300 are also automatically electric-connected to each other, thereby simultaneously completing optical coupling and electric connection between the opto-electric interconnection unit 300 and the opto-electric transmission unit 100.

Referring to FIG. 11B, the concave-shaped micro structure 303 formed in the opto-electric interconnection unit 300 is inserted into the convex-shaped micro structure 106 formed on the optical bench 103 of the opto-electric transmission unit 100, thereby completing automatic, vertical and horizontal optical coupling between the active region 110 of the opto-electric device 104 and the optical waveguide 301.

In addition, the electric interconnection 107 formed on the convex-shaped micro structure 106 of the optical bench 103 and the electric interconnection 302 formed on the concave surface of the concave-shaped micro structure 303 of the opto-electric interconnection unit 300 are automatically connected.

Figure 12:
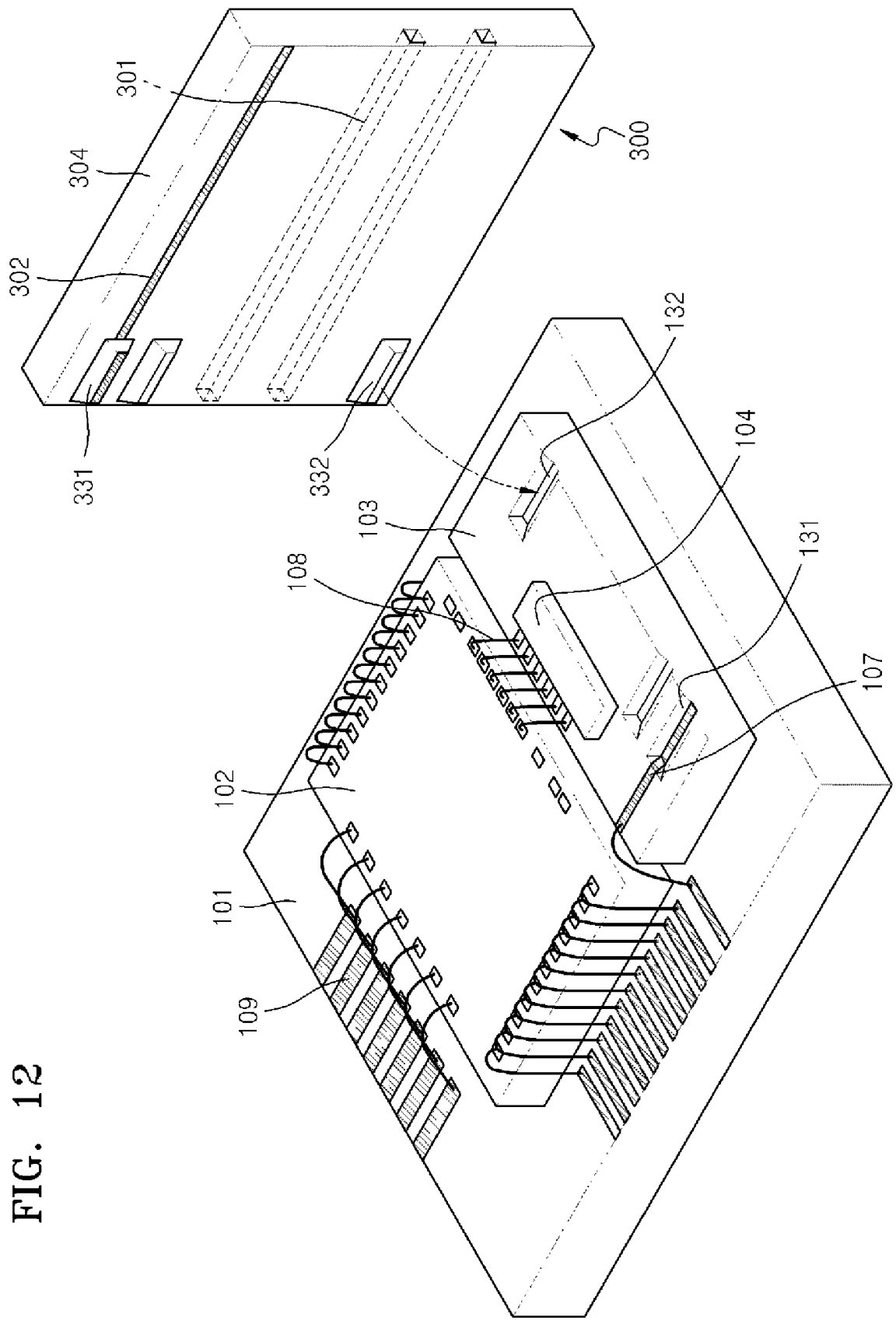
FIG. 12 illustrates the structure of an opto-electric bus module according to another embodiment of the present invention.

FIG. 12 illustrates the structure of an opto-electric bus module according to another embodiment of the present invention.

Referring to FIG. 12, the optical waveguide 301 inserted into the flexible polymer structure 304, the electric interconnection 302, a convex-shaped micro structure 331 (hereinafter, referred to as a first convex-shaped micro structure) where the electric interconnection 302 is formed, and a convex-shaped micro structure 332 (hereinafter, referred to as a second convex-shaped micro structure) where the electric interconnection 302 is not formed. An end of the electric interconnection 302 is opened on the upper surface of the first convex-shaped micro structure 331.

The opto-electric transmission/reception unit 100 or 200 includes the opto-electric device drive 102 and the optical bench 103 mounted on the PCB 101. In the optical bench 103, the opto-electric device 104, a concave-shaped micro structure 131 (hereinafter, referred to as a first concave-shaped micro structure) where the electric interconnection 107 is formed, and a concave-shaped micro structure 132 (hereinafter, referred to as a second concave-shaped micro structure) where the electric interconnection 107 is not formed. An end of the electric interconnection 107 extends to the concave surface of the first concave-shaped micro structure 131 of the optical bench 103. The opto-electric device 104 is a light emitting device or a light receiving device.

Three types of electric interconnections, i.e., the electric interconnection 107 for electric communication, an electric interconnection 108 for an optical device, and an integrated electric interconnection 109 are formed.

FIGS. 13A through 13D illustrate optical coupling and electric coupling of the opto-electric bus module according to another embodiment of the present invention.

Figure 13A:
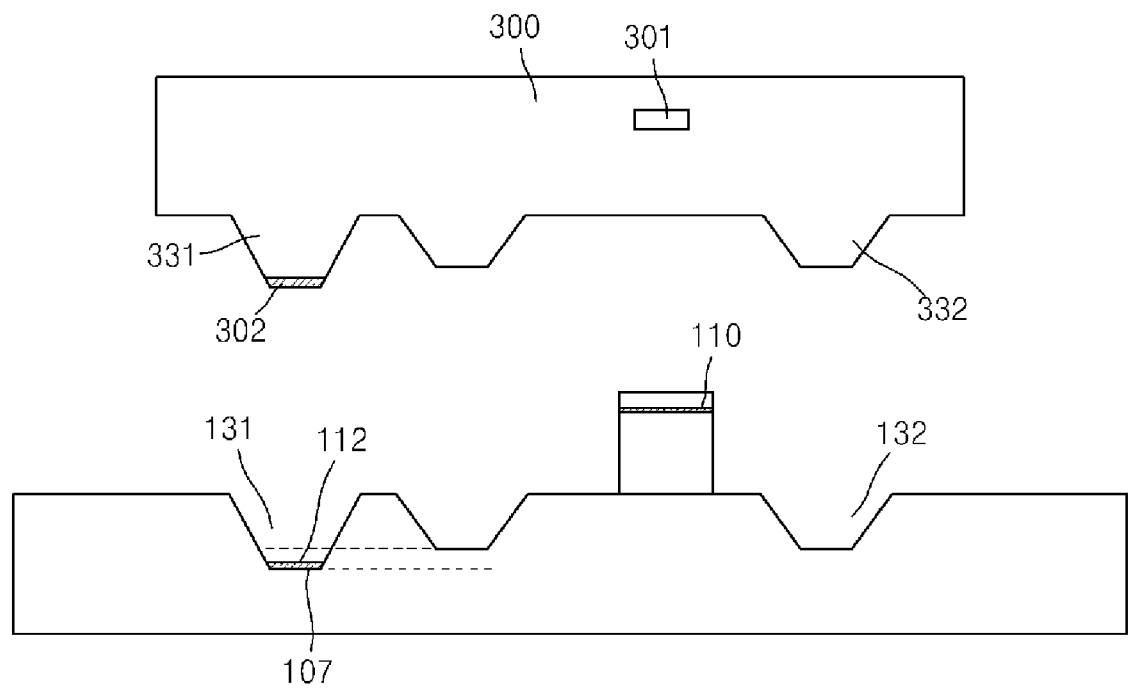
FIGS. 13A through 13E illustrate optical coupling and electric coupling of the opto-electric bus module according to another embodiment of the present invention.

Referring to FIG. 13A, the opto-electric interconnection unit 300 includes the first convex-shaped micro structure 331 and the second convex-shaped micro structure 332, and the optical waveguide unit 301 formed therebetween.

The optical bench 103 includes the first concave-shaped micro structure 131 where the electric interconnection 107 is formed, and the second concave-shaped micro structure 132.

On the lower surface of the first concave-shaped micro structure 131, the electric interconnection 107 and a space 112 for insertion of the electric interconnection 302 formed on the upper surface of the first convex-shaped micro structure 331 of the opto-electric interconnection unit 300 may be provided together.

Figure 13B:
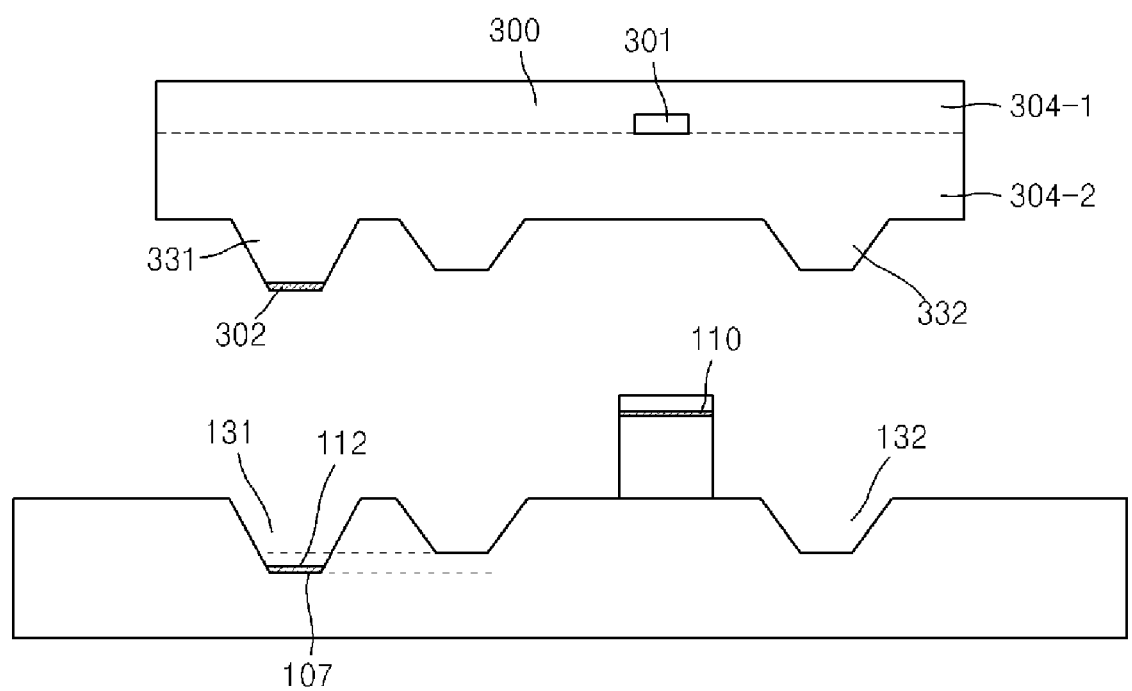

Referring to FIG. 13B, the first convex-shaped micro structure 331 is connected to the first concave-shaped micro structure 131 and the second convex-shaped micro structure 332 is connected to the second concave-shaped micro structure 132.

The second convex-shaped micro structure 332 formed in the opto-electric interconnection unit 300 and the second concave-shaped micro structure 132 formed in the optical bench 103 of the opto-electric transmission/reception unit 100 or 200 are coupled to each other, thereby completing automatic, horizontal and vertical optical alignments between the opto-electric device 104 and the optical waveguide unit 301.

In addition, the electric interconnection 107 formed on the concave surface of the concave-shaped micro structure 131 formed on the optical bench 103 and the electric interconnection 302 formed on the convex surface of the convex-shaped micro structure 331 of the opto-electric interconnection unit 300 are electric-connected automatically, thereby simultaneously completing optical coupling and electric connection between the opto-electric interconnection unit 300 and the opto-electric transmission unit 100.

At this time, the second convex-shaped micro structure 332 and the second concave-shaped micro structure 131 are used for vertical and horizontal optical alignments between the optical waveguide unit 301 of the opto-electric interconnection unit 300 and the opto-electric device 104.

By adjusting the heights of the second convex-shaped micro structure 332 and the second concave-shaped micro structure 132, the height of the optical waveguide 301 of the opto-electric interconnection unit 300 placed on the optical bench 103 can be adjusted. Moreover, the horizontal position of the optical waveguide 301 of the opto-electric interconnection unit 300 placed on the optical bench 103 can be adjusted by adjusting the positions of the second concave-shaped micro structure 132 and the second convex-shaped micro structure 332.

Coupling between the first convex-shaped micro structure 331 and the first concave-shaped micro structure 131 is used for electric connection between the electric interconnection 302 formed on the convex surface of the first convex-shaped micro structure 331 and the electric interconnection 107 formed on the concave surface of the first concave-shaped micro structure 131.

The electric interconnection 302 formed on the convex surface of the first convex-shaped micro structure 331 has some thickness. Thus, a designed step between the optical waveguide unit 301 and the opto-electric device 104 may be changed during coupling between the opto-electric interconnection unit 300 and the optical bench 103. To prevent such a change, the first concave-shaped micro structure 131 includes the space 112 into which the electric interconnection 302 of the first convex-shaped micro structure 331 is inserted.

In other words, when the opto-electric interconnection unit 300 is coupled to the optical bench 103, the space 112 accommodates the electric interconnection 302, thereby maintaining the step between the optical waveguide unit 301 and the opto-electric device 104, which is formed during coupling between the second concave-shaped micro structure 132 and the second convex-shaped micro structure 331, constant and thus preventing change of optical coupling efficiency.

Figure 13C:
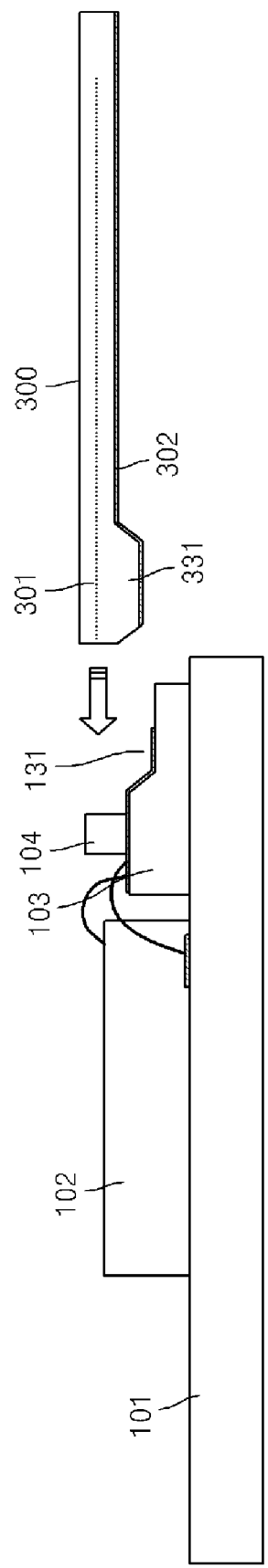

FIG. 13C illustrates a horizontal cross-section where the opto-electric interconnection unit 300 is opto-electric-coupled with the optical bench 103 of the opto-electric transmission/reception unit 100 or 200. Like a description made with reference to FIGS. 2A through 2C, the convex-shaped micro structure 331 of the opto-electric interconnection unit 300 is connected to the concave-shaped micro structure 131 of the optical bench 103, thereby simultaneously completing optical alignment and electric connection.

The first convex-shaped micro structure 331 is connected to the first concave-shaped micro structure 131 and the second convex-shaped micro structure 332 is connected to the second concave-shaped micro structure 132.

The second convex-shaped micro structure 332 formed on the opto-electric interconnection unit 300 and the second convex-shaped micro structure 132 formed on the optical bench 103 of the opto-electric transmission/reception unit 100 or 200 are coupled to each other by sliding, thereby completing automatic, vertical and horizontal optical alignment between the opto-electric device 104 and the optical waveguide unit 301.

In addition, the electric interconnection 107 formed on the concave surface of the concave-shaped micro structure 131 formed in the optical bench 103 and the electric interconnection 302 formed on the convex surface of the convex-shaped micro structure 331 of the opto-electric interconnection unit 300 are automatically electric-coupled, thereby simultaneously completing electric connection and optical coupling between the opto-electric interconnection unit 300 and the opto-electric transmission unit 100.

Figure 13D:
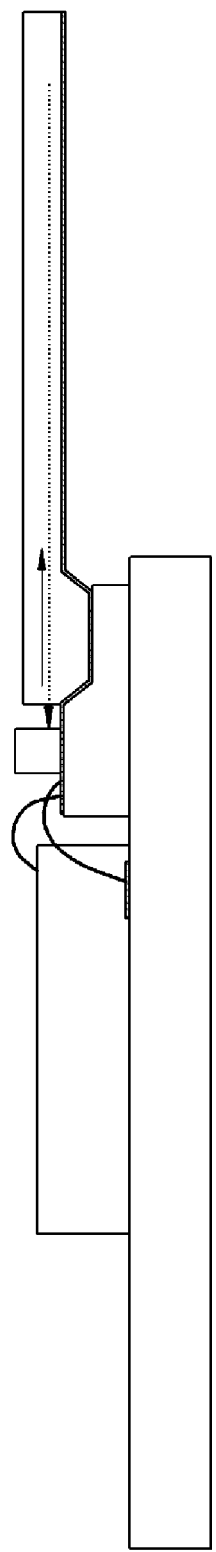

Referring to FIG. 13D, the convex-shaped micro structure 331 formed on the opto-electric interconnection unit 300 is inserted into the concave-shaped micro structure 131 of the optical bench 103 of the opto-electric transmission/reception unit 100 or 200, thereby completing automatic, vertical and horizontal optical-couplings between the active region 110 of the opto-electric device 104 and the optical waveguide unit 301.

Moreover, the electric interconnection 107 formed on the concave surface of the concave-shaped micro structure 106 of the optical bench 103 and the electric interconnection 302 formed on the convex surface of the convex-shaped micro structure 331 of the opto-electric interconnection unit 300 are automatically connected to each other.

Figure 13E:
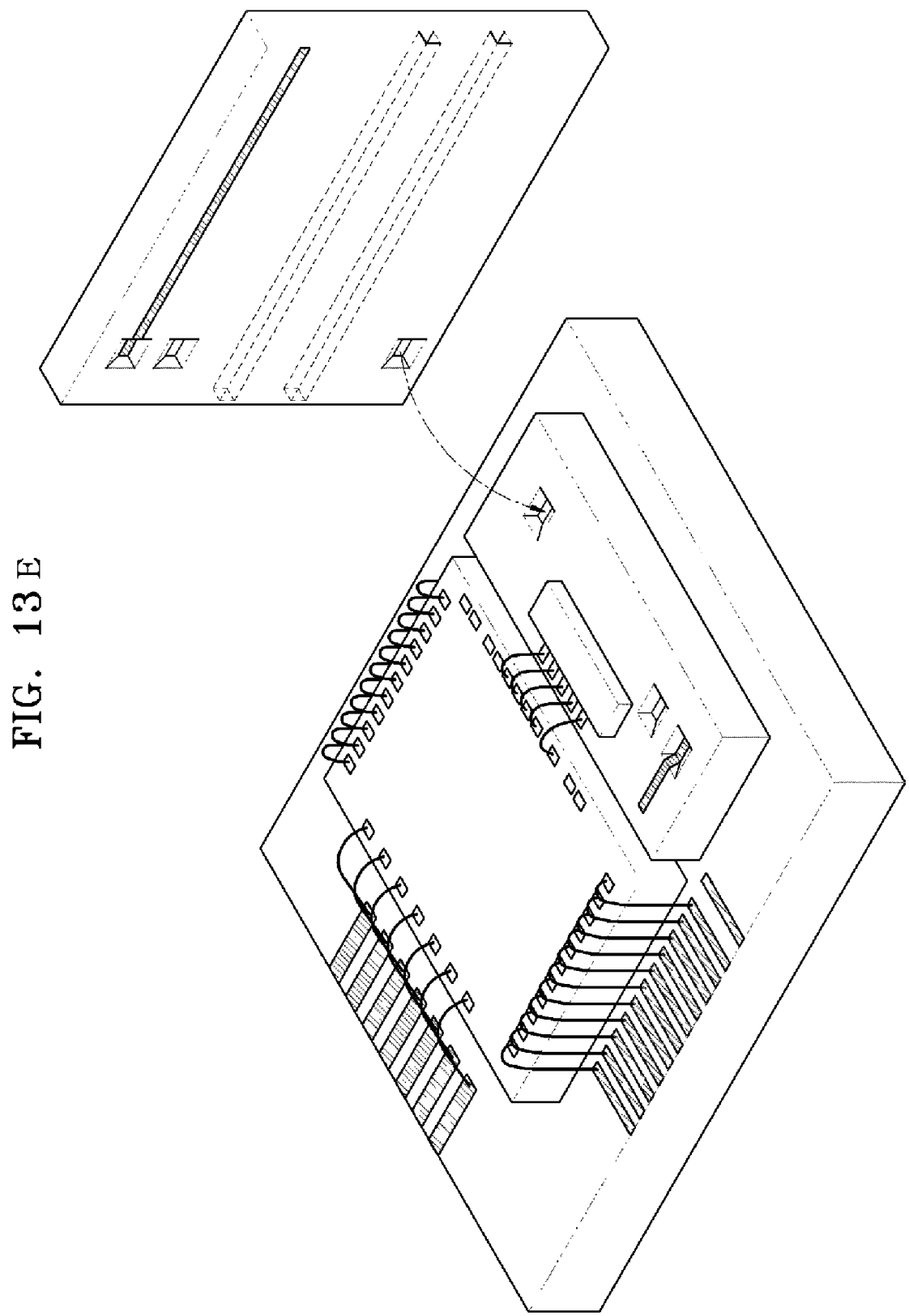

Referring to FIG. 13E, the convex-shaped micro structure 331 or 332 of the opto-electric interconnection unit 300 and the concave-micro structure 131 or 132 of the optical bench 103 may be formed in pyramid shape in order to apply vertical flip-chip coupling to coupling between the concave-shaped micro structure 131 or 132 and the concave-shaped micro structure 331 or 332.

Figure 14A:
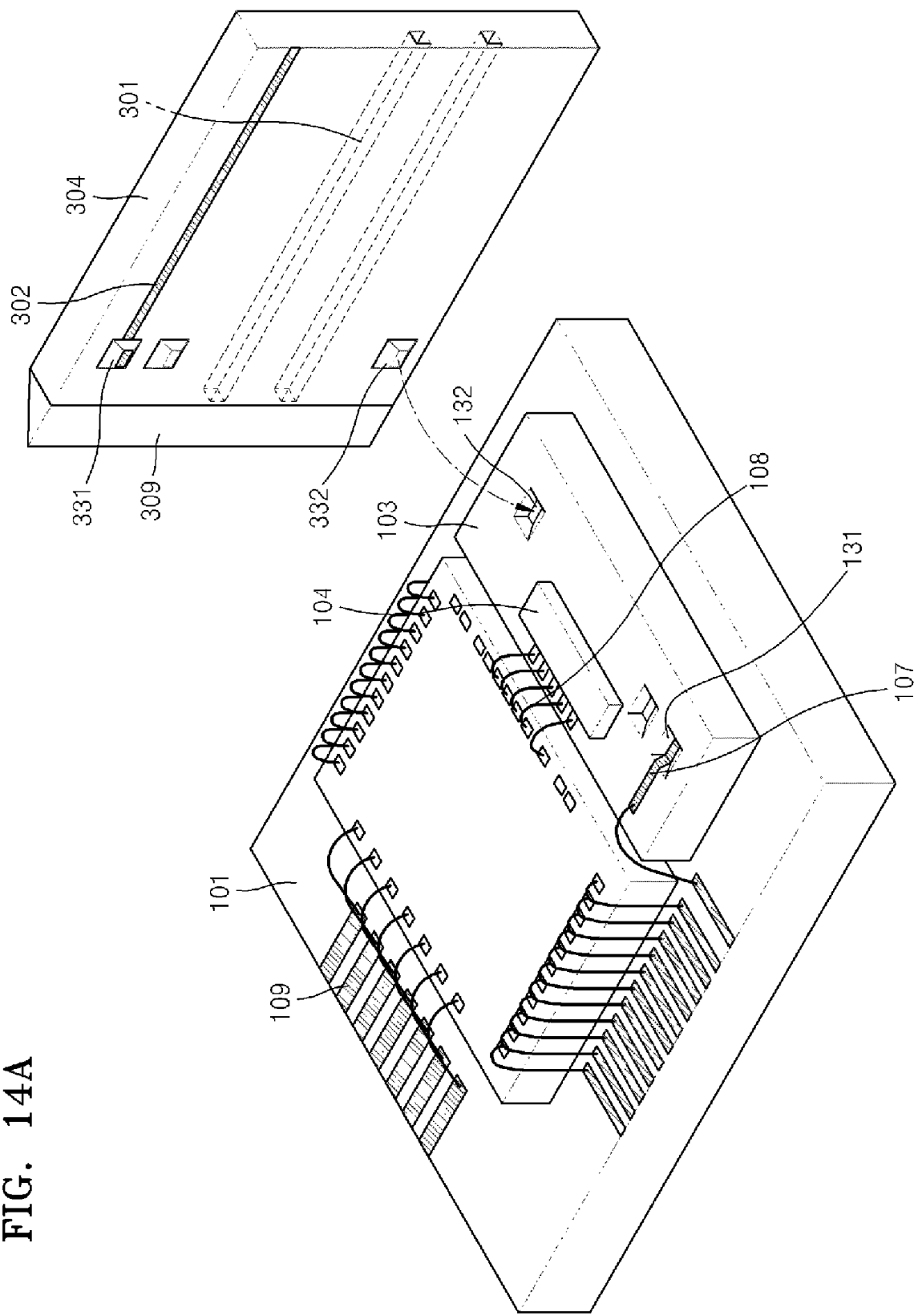
FIGS. 14A through 14C illustrate the structure of an opto-electric bus module according to another embodiment of the present invention.
Figure 14B:
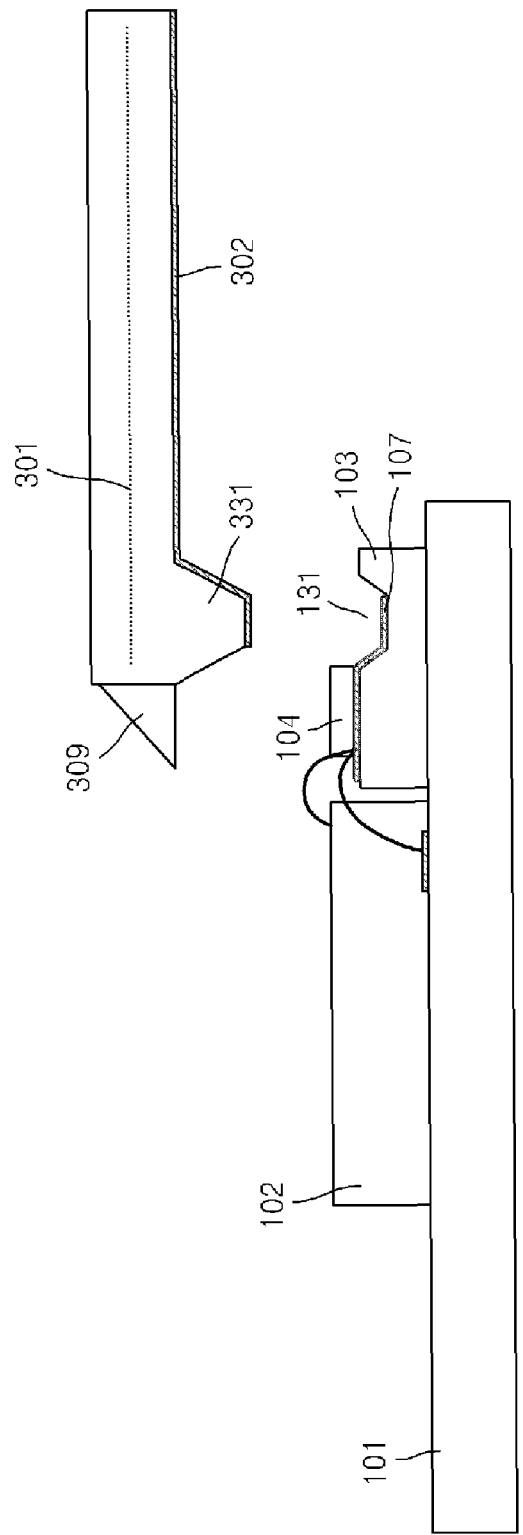
Figure 14C:
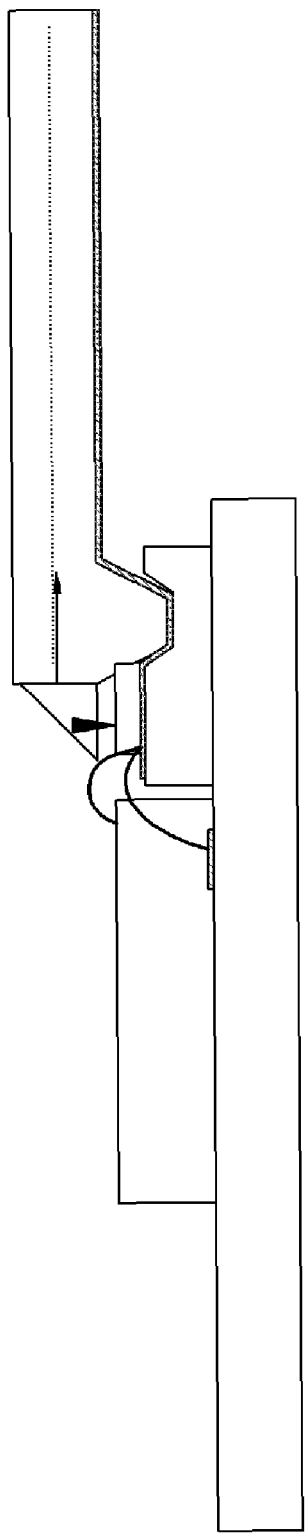

FIGS. 14A through 14C illustrate the structure of an opto-electric bus module according to another embodiment of the present invention.

In FIG. 14A, the opto-electric bus module includes all components illustrated in and described with reference to FIGS. 12 and 13E. However, a cross-section of the optical waveguide 301 of the opto-electric interconnection unit 300 further includes the 45°-reflective mirror 309. This opto-electric bus module can be applied to the use of a VCSEL or a PD which vertically emits or receives light.

The principle of optical coupling and electric coupling between the opto-electric interconnection unit 300 and the opto-electric transmission/reception unit 100 or 200 is as illustrated in FIGS. 14B and 14C and is the same as that described with reference to FIGS. 12 through 13E.

FIGS. 15A through 15D illustrate examples for improving the efficiency of optical coupling of the opto-electric bus module according to another embodiment of the present invention.

Figure 15A:
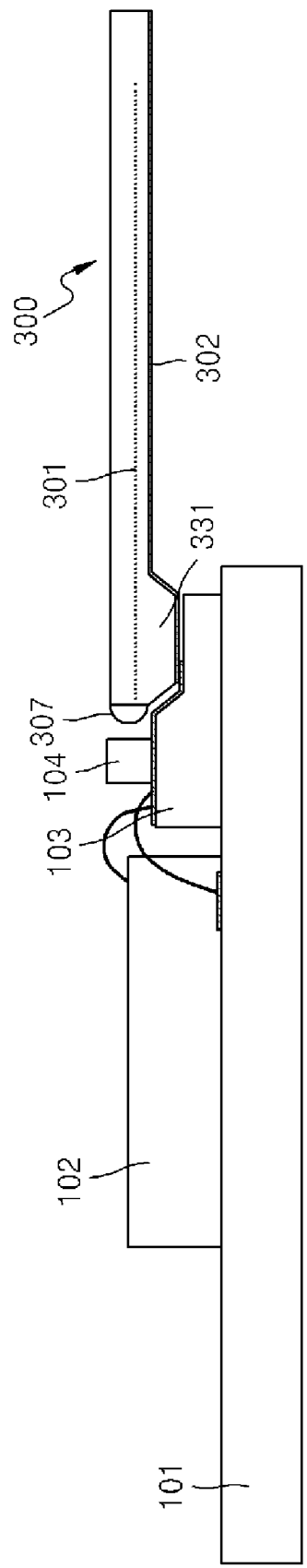

In FIG. 15A, the opto-electric device 104 supplies a collected light source through the lens 307 included in the opto-electric interconnection unit 300 to the optical waveguide 301, thereby high-efficiency optical coupling.

Figure 15B:
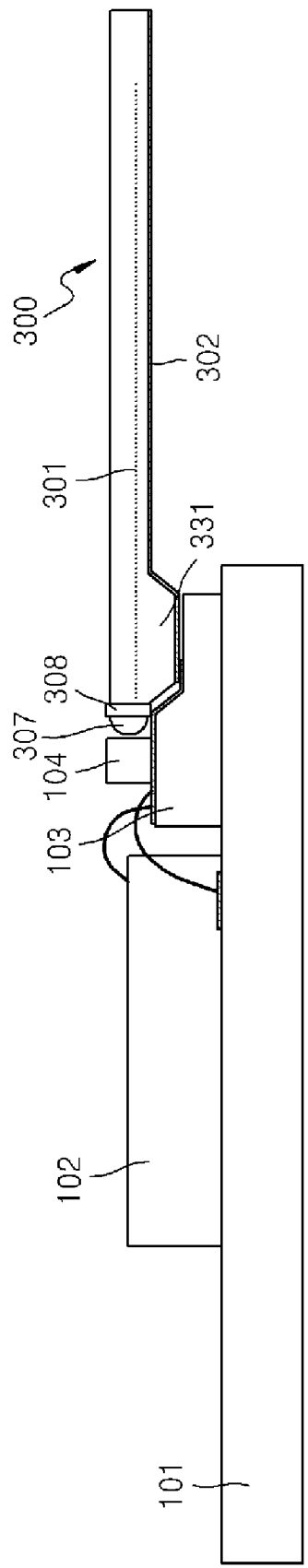

In FIG. 15B, the opto-electric interconnection unit 300 further includes the lens 307 and the polarizer 308. For excitation of surface plasmon polariton that theoretically describes optical transmission of a metal optical waveguide, light in a TM mode has to be incident.

If light generated by a light emitting device, e.g., a VCSEL, does not has the TM mode or has only a TE mode, TE-mode light generated by the light emitting device is converted into TM-mode light and thus the TM-mode light required for excitation of the surface plasmon polariton of the optical waveguide can be incident by using the polarizer 308.

In FIG. 15C, the opto-electric device 104 supplies a collected light source by the 45°-reflective mirror 309 included in the opto-electric interconnection unit 300 through the lens 307 to the optical waveguide 301, thereby providing high-efficiency optical coupling.

In FIG. 15D, the opto-electric interconnection unit 300 further includes the polarizer 308 in addition to the 45°-reflective mirror 309 and the lens 307. For excitation of surface plasmon polariton that theoretically describes optical transmission of a metal optical waveguide, light in a TM mode has to be incident.

If light generated by a light emitting device, e.g., a VCSEL, does not has the TM mode or has only a TE mode, TE-mode light generated by the light emitting device is converted into TM-mode light and thus the TM-mode light required for excitation of the surface plasmon polariton of the optical waveguide can be incident by using the polarizer 308.

Figure 16:
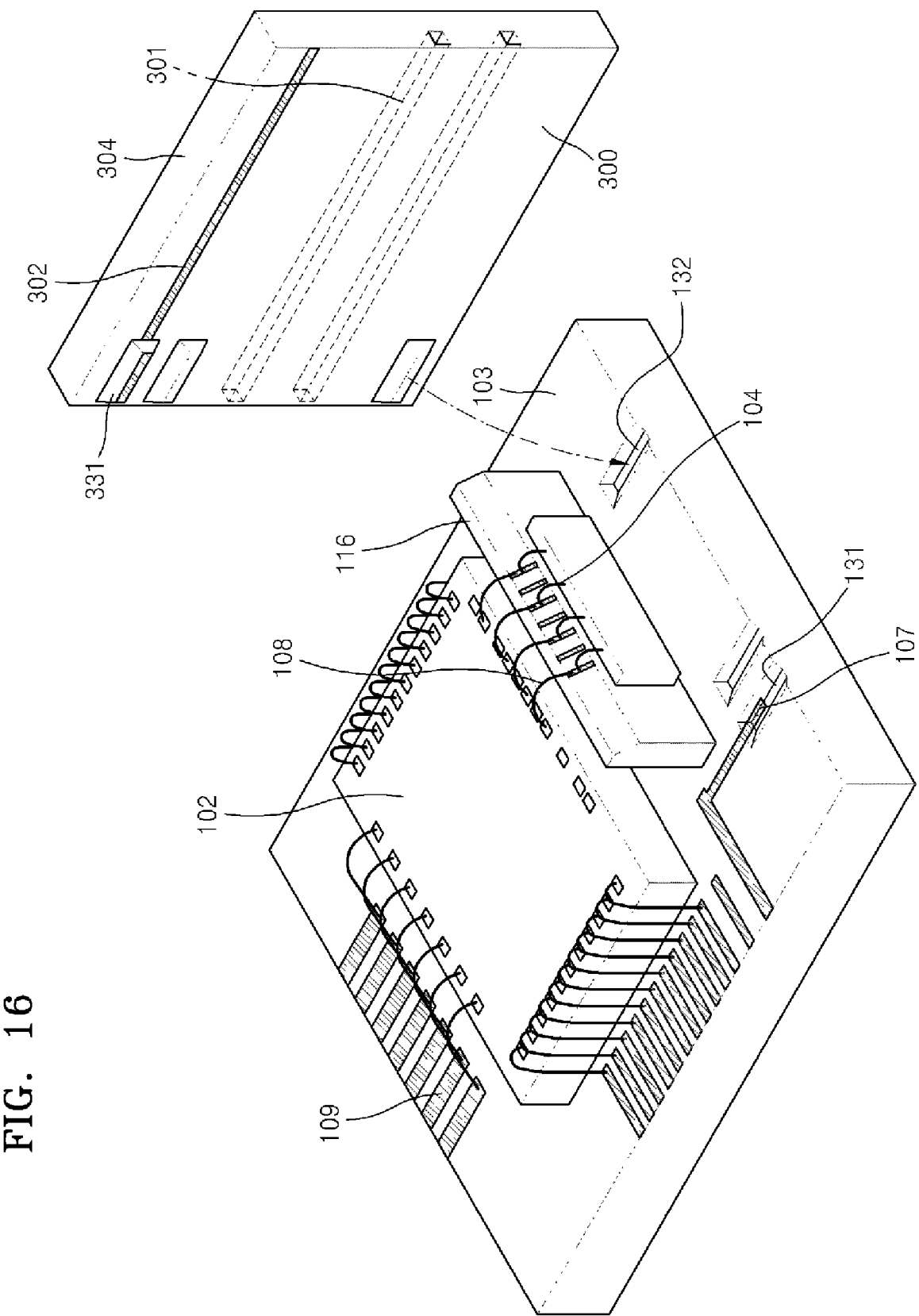
FIG. 16 illustrates the structure of an opto-electric bus module according to another embodiment of the present invention.

FIG. 16 illustrates the structure of an opto-electric bus module according to another embodiment of the present invention.

Referring to FIG. 16, the opto-electric interconnection unit 300 includes the optical waveguide 301 inserted into the flexible polymer structure 304, the first convex-shaped micro structure 331 where the electric interconnection 302 is formed, and the second convex-shaped micro structure 332 where the electric interconnection 302 is not formed. An end of the electric interconnection 302 is opened on the upper surface of the first convex-shaped micro structure 331.

The opto-electric transmission/reception unit 100 or 200 includes a first optical bench 103, the opto-electric device drive 102 formed on the optical bench 103, and a second optical bench 116. The first concave-shaped micro structure 131 where the electric interconnection 107 is formed and the second concave-shaped micro structure 132 are formed in the first optical bench 103. The opto-electric device 104 is formed on the second optical bench 116. An end of the electric interconnection 107 extends to the lower surface of the first concave-shaped micro structure 131 of the first optical bench 103. The opto-electric device 104 is a light emitting device or a light receiving device.

Three types of electric interconnections, i.e., the electric interconnection 107 for electric communication, the electric interconnection 108 for an optical device, and the integrated electric interconnection 109 are formed.

Figure 17A:
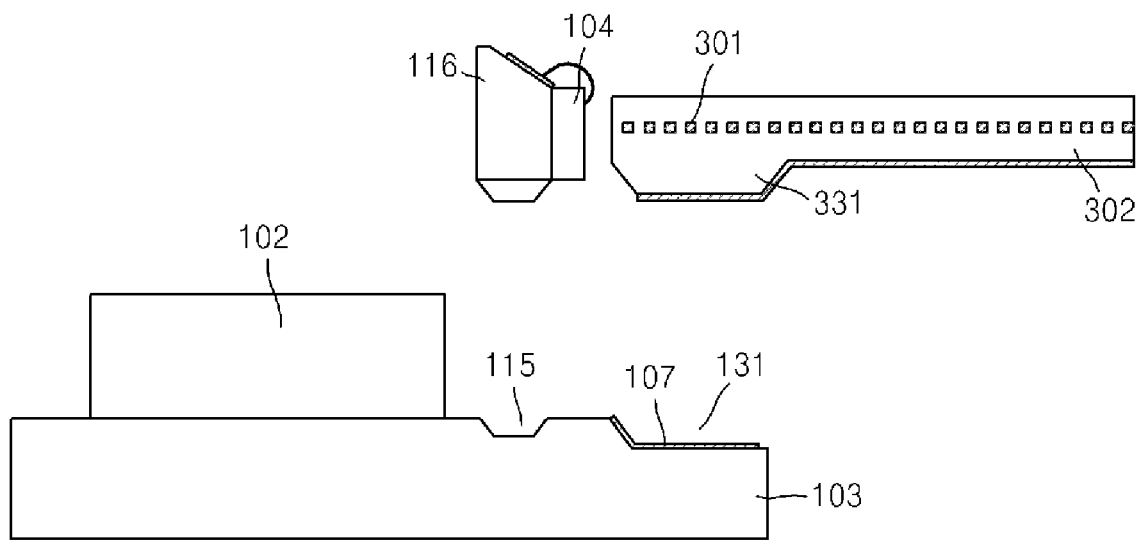
FIGS. 17A and 17B illustrate optical coupling and electric coupling of the opto-electric bus module according to another embodiment of the present invention.
Figure 17B:
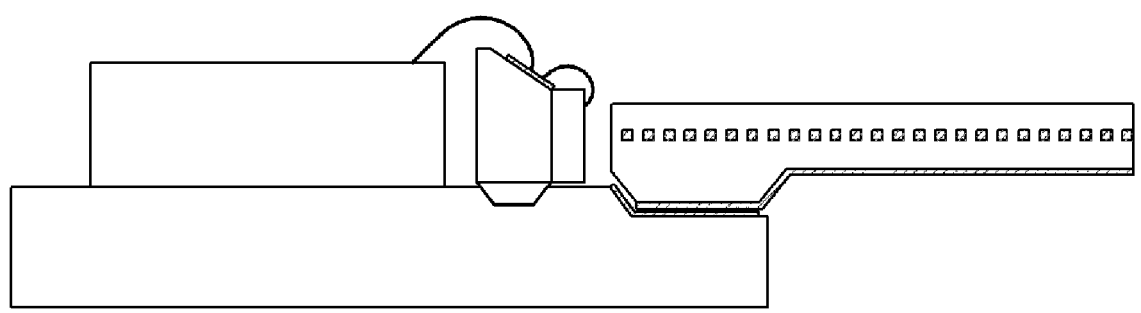

FIGS. 17A and 17B illustrate optical coupling and electric coupling of the opto-electric bus module according to another embodiment of the present invention.

FIG. 17A illustrates a horizontal cross-section where the opto-electric interconnection unit 300 and the optical bench 103 of the opto-electric transmission/reception unit 100 or 200 are opto-electrically coupled to each other. The first convex-shaped micro structure 331 of the opto-electric interconnection unit 300 is connected to the first concave-shaped micro structure 131 of the optical bench 103, thereby simultaneously completing optical alignment and electric connection.

The first convex-shaped micro structure 331 is connected to the first concave-shaped micro structure 131 and the second convex-shaped micro structure 332 is connected to the second concave-shaped micro structure 132.

In addition, the optical bench 116 having the opto-electric device 104 mounted thereon is inserted into a third concave-shaped micro structure 115.

The second convex-shaped micro structure 332 formed on the opto-electric interconnection unit 300 and the second concave-shaped micro structure 132 formed in the optical bench 103 of the opto-electric transmission/reception unit 100 or 200 are coupled to each other by sliding, thereby completing automatic, vertical and horizontal optical alignments between the opto-electric device 104 and the optical waveguide unit 301.

In addition, the electric interconnection 107 formed on the concave surface of the concave-shaped micro structure 131 formed in the optical bench 103 and the electric interconnection 302 formed on the convex surface of a portion of the convex-shaped micro structure 331 of the opto-electric interconnection unit 300 are electric-connected automatically, thereby simultaneously completing optical coupling and electric connection between the opto-electric interconnection unit 300 and the opto-electric transmission unit 100.

Referring to FIG. 17B, the convex-shaped micro structure 331 formed on the opto-electric interconnection unit 300 is inserted into the concave-shaped micro structure 131 formed in the optical bench 103 of the opto-electric transmission/reception unit 100 or 200, thereby completing automatic, vertical and horizontal optical couplings between the active region 110 of the opto-electric device 104 and the optical waveguide unit 301.

Moreover, the electric interconnection 107 formed on the concave surface of the concave-shaped micro structure 106 formed in the optical bench 103 and the electric interconnection 302 formed on the convex surface of the convex-shaped micro structure 331 of the opto-electric interconnection unit 300 are automatically connected to each other.

Figure 18A:
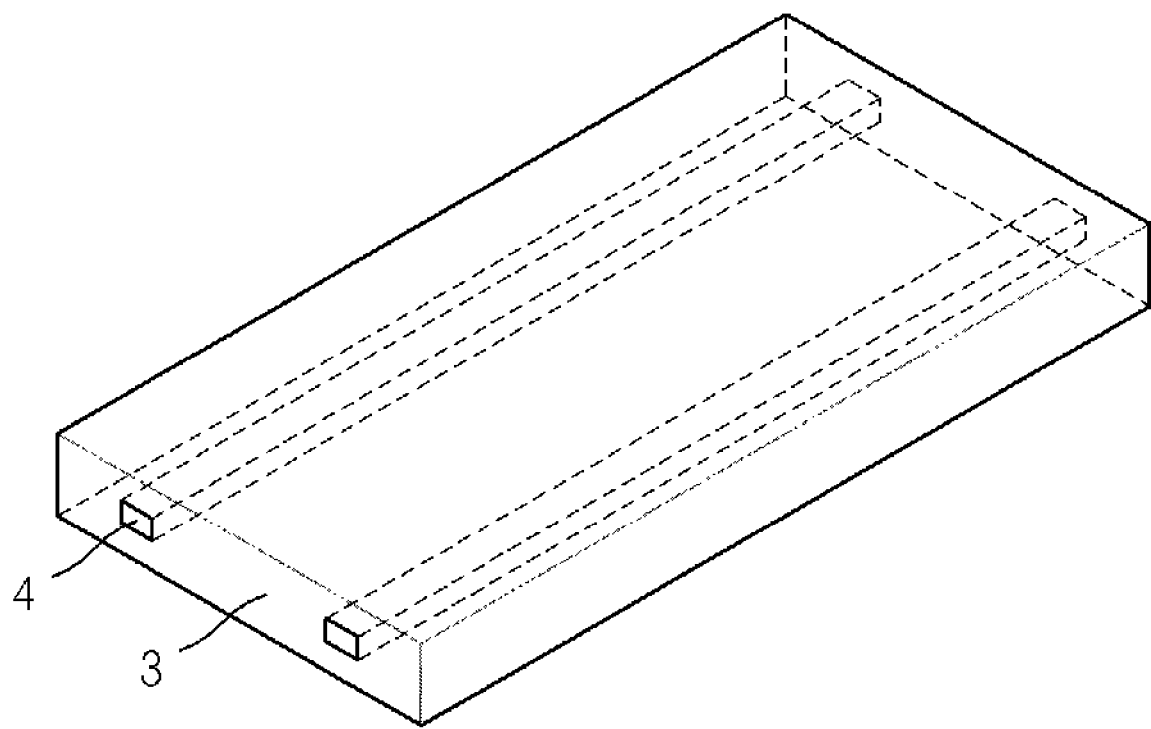
FIGS. 18A through 18C are diagrams for explaining the structure of an optical waveguide and the principle of optical transmission used in an optical waveguide unit of an opto-electric bus module according to an embodiment of the present invention.
Figure 18B:
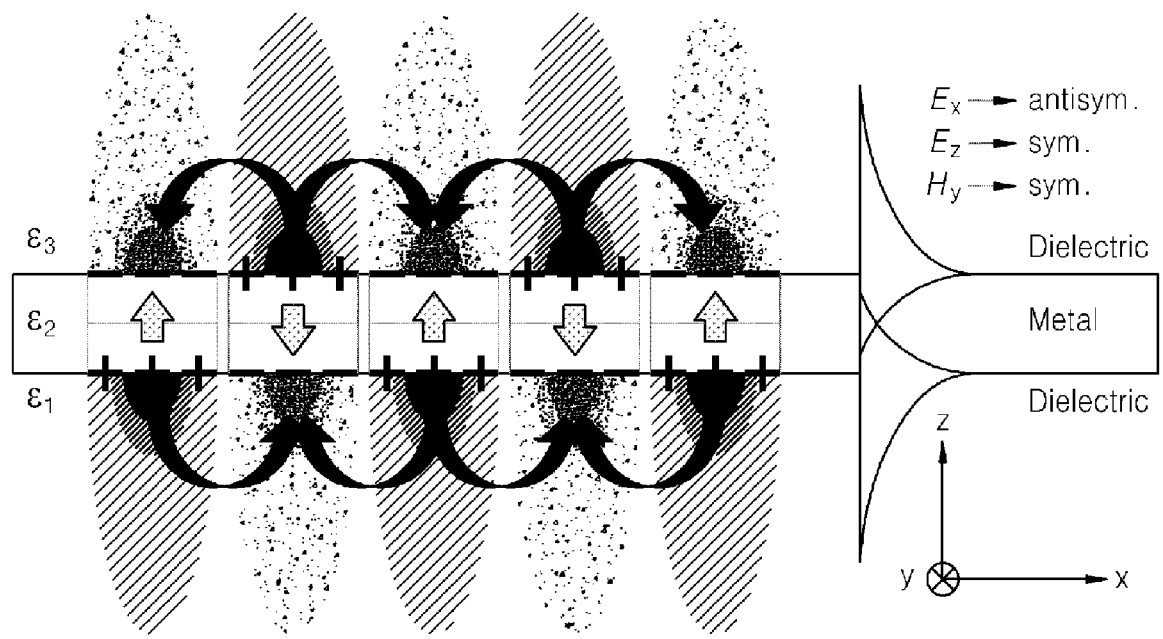
Figure 18C:
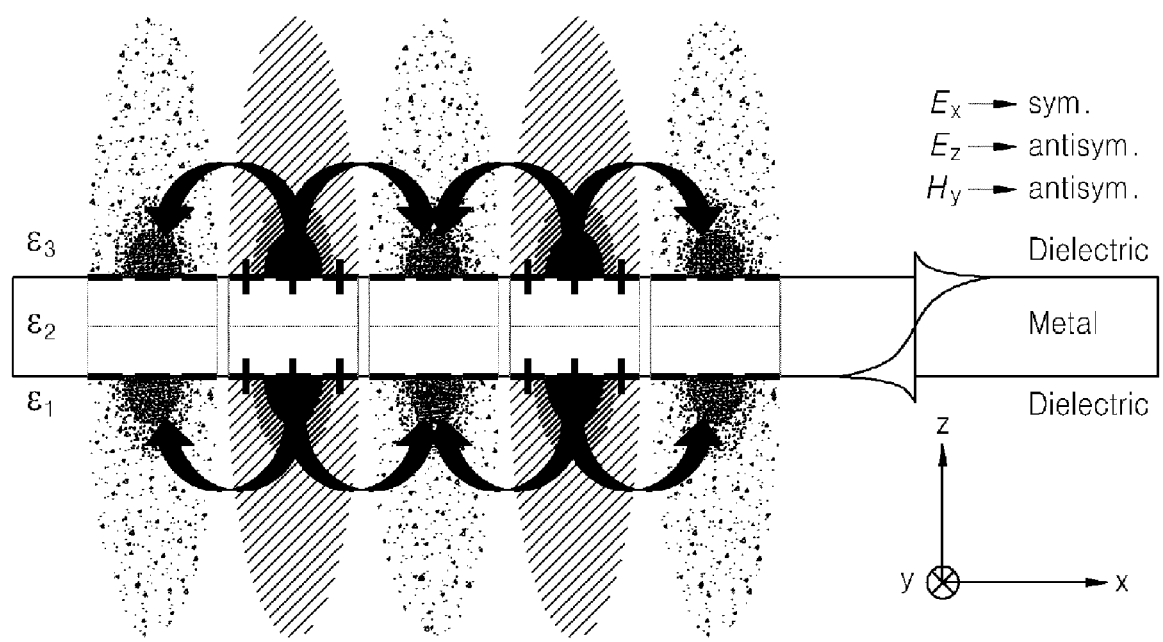

FIGS. 18A through 18C are diagrams for explaining the structure of an optical waveguide and the principle of optical transmission used in an optical waveguide unit of an opto-electric bus module according to an embodiment of the present invention.

As illustrated in FIG. 18A, a metal line is embedded within a dielectric substance 3. An optical waveguide 4 can transmit incident light up to a distance of several tens of centimeters by using the metal line whose width is several tens of microns. Such an optical waveguide using a metal line is called a metal optical waveguide. In the present invention, an optical waveguide may be a metal optical waveguide or may be flexible. Optical transmission of the metal optical waveguide may be described based on long-range surface plasmon polariton (LR_SPP) theory.

Briefly describing an optical waveguiding principle of the meta-line optical waveguide, an optical signal is delivered by polarizations of free electrons in the metal line and mutual coupling between the polarizations.

Consecutive couplings between the free electrons are called surface plasmon polariton and long-range optical transmission using surface plasmon polariton is theoretically called long-range surface plasmon polariton (LR-SPP).

A surface plasmon (SP) is a charge-density oscillating wave which travels along a boundary where real number terms of a dielectric constant have opposite signs, and surface charge density oscillation forms a longitudinal surface bound wave.

The longitudinal surface bound wave is a component where an electric-field component of an incident wave is vertical with respect to the boundary. Only a TM mode can excite and waveguide long-range surface plasmon polariton.

Such a metal optical waveguide can sufficiently deliver an optical signal with a metal line of a fine size, e.g., a thickness of 5-200 nm and a width of 2-100 µm.

FIG. 18B illustrates a state where an optical signal is smoothly transmitted by appropriate formation of polarizations of free electrons. FIG. 18C illustrates a state where an optical signal is not smoothly transmitted by inappropriate formation of polarizations of free electrons.

In other words, when a TM mode Ex along an x-axis direction is asymmetric by means of polarizations of free electrons, optical transmission is smoothly performed.

In right sides of FIGS. 18B and 18C, the intensities of transmitted optical signals are briefly expressed. It can be seen that the optical signal in FIG. 13B is transmitted more smoothly than the optical signal in FIG. 13C.

Dielectric constants ∈1 and ∈3 of dielectric substances on and under the metal line may be the same as or different from each other, and the metal optical waveguide may be formed by surrounding the metal line with the same dielectric substance by using such a principle.

Figure 19:
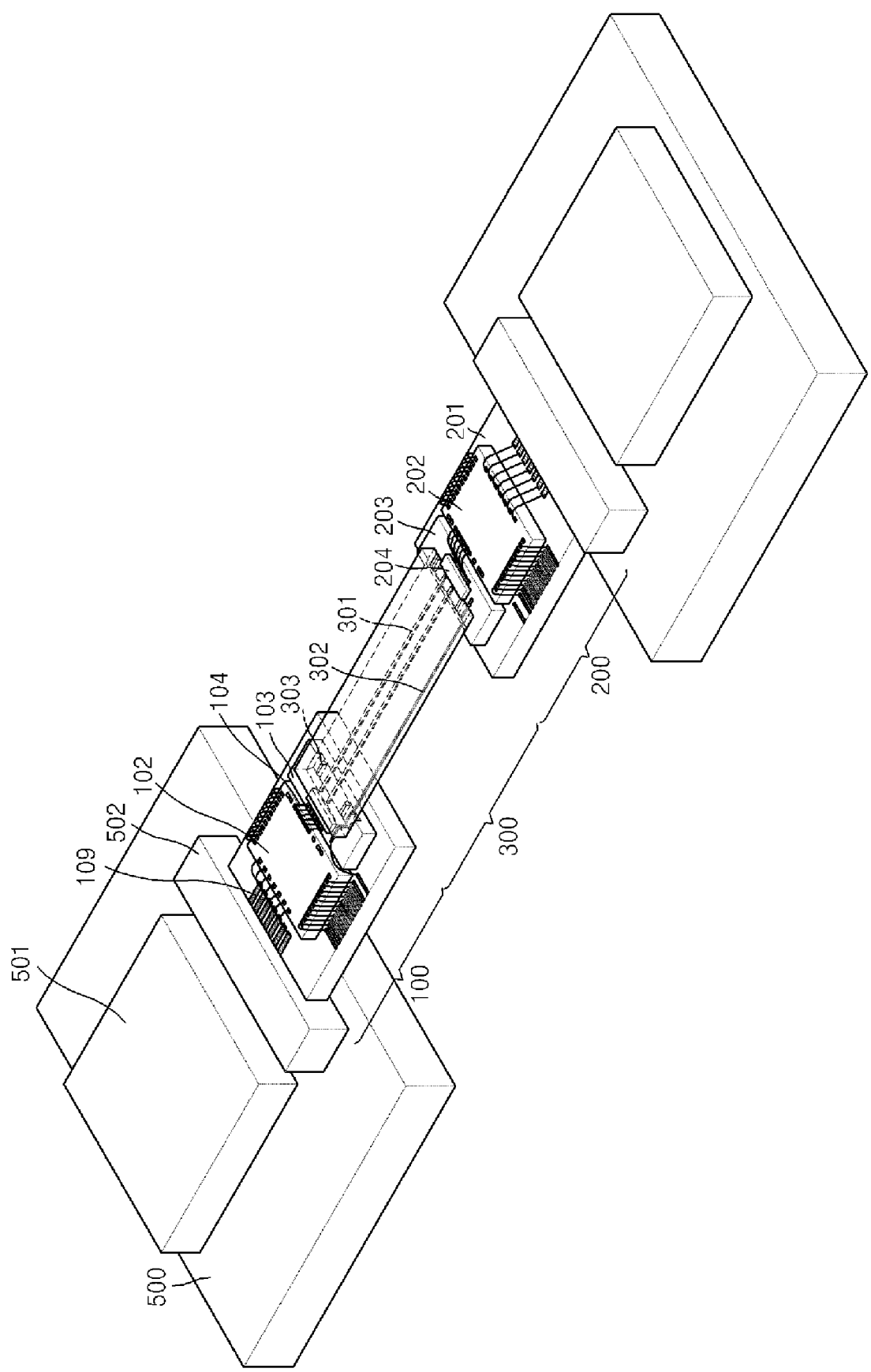
FIG. 19 illustrates a manually-connected opto-electric bus module and a communication system providing opto-electric simultaneous communication by using the manually-connected opto-electric bus module according to an embodiment of the present invention.
Figure 20A:
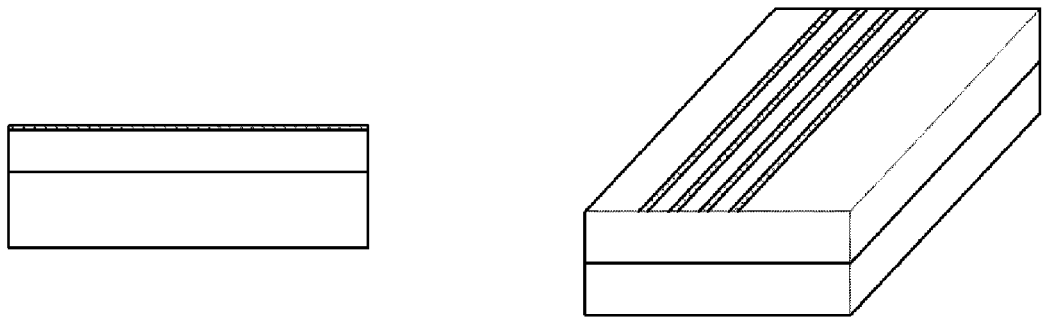
FIGS. 20 and 21 are diagrams for explaining a method of manufacturing an opto-electric interconnection unit according to an embodiment of the present invention.
Figure 20B:
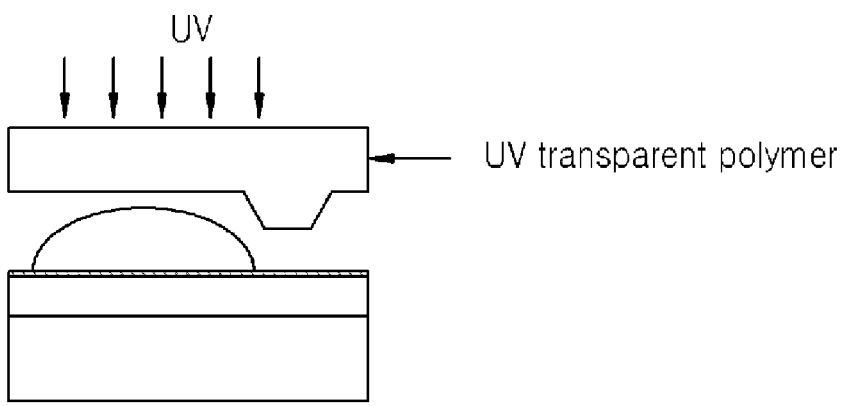
Figure 20C:
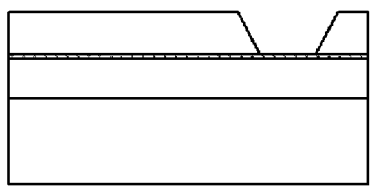
Figure 20C:
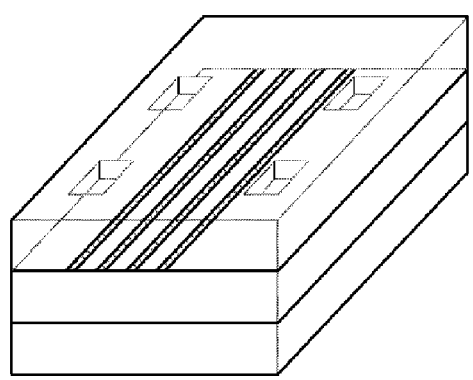
Figure 21A:
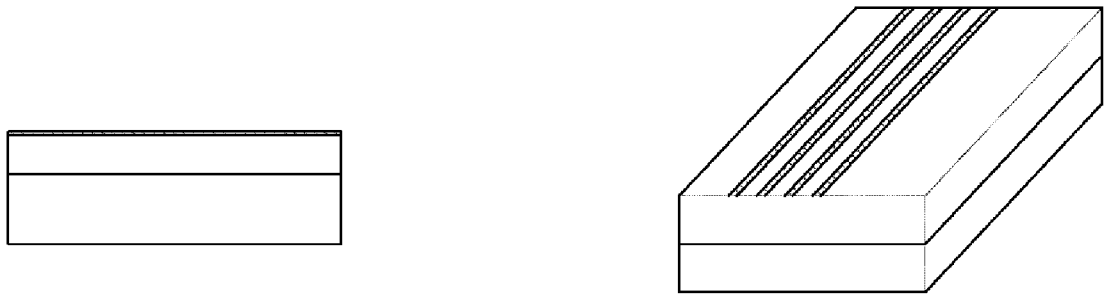
Figure 21B:
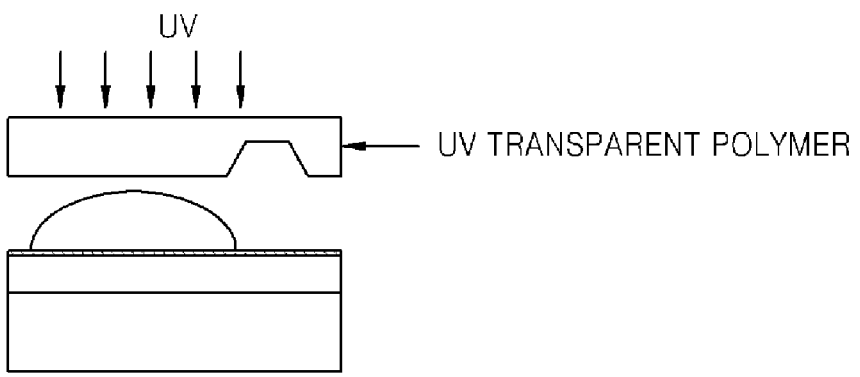
Figure 21C:
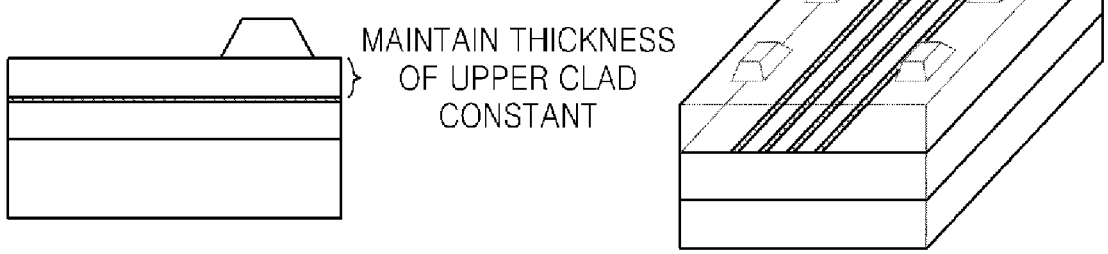
Figure 21D:
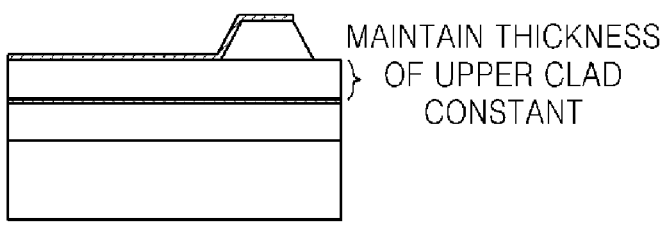

FIG. 19 illustrates a manually-connected opto-electric bus module and a communication system providing opto-electric simultaneous communication by using the manually-connected opto-electric bus module according to an embodiment of the present invention.

Referring to FIG. 19, an integrated electric signal (including an opto-electric signal and an electric communication signal) generated by a first semiconductor chip 501 of a first main board 500 is delivered to an integrated electric interconnection 109 of the opto-electric transmission unit 100 of the opto-electric bus module through an electric connector 502. The opto-electric signal of the integrated electric signal of the integrated electric interconnection 109 is separately delivered to the opto-electric device drive 102 and delivered to the opto-electric device 104 through the electric interconnection 108, thereby generating an optical signal. The generated optical signal is delivered to the opto-electric reception unit 200 through the optical waveguide 301 of the opto-electric interconnection unit 300. In addition, the electric communication signal of the integrated electric signal of the integrated electric interconnection 109 is separately connected to the electric interconnection 107 and delivered to the opto-electric reception unit 200 through the electric interconnection 302 of the opto-electric interconnection unit 300.

FIGS. 20 and 21 are diagrams for explaining a method of manufacturing an opto-electric interconnection unit according to an embodiment of the present invention. In other words, FIG. 20 is a diagram for explaining a method of manufacturing an opto-electric interconnection unit including a concave-shaped micro structure and FIG. 21 is a diagram for explaining a method of manufacturing an opto-electric interconnection unit including a convex-shaped micro structure.

Referring to FIG. 20, ultraviolet (UV) hardened polymer is coated onto a substrate and is hardened by UV rays in order to form a lower clad, and an optical waveguide and an electric interconnection are formed on the lower clad.

UV hardened polymer is coated onto the lower clad in order to form an upper clad, and UV transparent mold having a convex-shaped micro structure formed therein is pressed onto the upper clad and then UV hardening is performed. The mold is separated from the upper clad, thereby obtaining an opto-electric interconnection unit having a concave-shaped micro structure where an electrode is formed.

Referring to FIG. 21, UV hardening polymer is coated onto a substrate and is hardened by UV rays in order to form a lower clad, and an optical waveguide is formed on the lower clad.

UV hardened polymer is coated onto the lower clad in order to form an upper clad, and UV transparent mold having a concave-shaped micro structure formed therein is pressed onto the upper clad and then UV hardening is performed. The mold is separated from the upper clad and an electric interconnection is formed on the upper clad.

As such, the opto-electric bus module according to the present invention provides optical/electric simultaneous communication between boards and is used for optical/electric simultaneous communication between a board and a chip or a chip and a chip.

The opto-electric bus module according to the present invention directly includes an optical device therein without using an additional optical component required for optical coupling between an opto-electric device and an optical waveguide, thereby providing a pluggable module capable of efficiently performing optical communication between semiconductor chips.

Moreover, the opto-electric bus module according to the present invention provides a way to simultaneously complete optical communication and electric communication between semiconductor devices by using electric interconnections included in the opto-electric bus module.

Furthermore, the opto-electric bus module according to the present invention uses a metal optical waveguide using long-range surface plasmon polariton for an optical waveguide, thereby forming the optical waveguide having a thickness of several tens of microns or less and thus sharply improving the thickness integration degree of the opto-electric bus module.

Therefore, according to the preset invention, optical communication and electric communication between semiconductor chips can be completed at the same time by using the opto-bus module which provides low-speed electric communication while manually maintaining solid optical coupling.

The present invention can also be embodied as a computer-readable code on a computer-readable recording medium. Examples of the computer-readable recording medium include magnetic recording media such as read-only memory (ROM), random-access memory (RAM), floppy disks, and hard disks, optical data storage devices such as CD-ROMs and digital versatile disks (DVDs), and carrier waves such as transmission over the Internet. The computer-readable recording medium can also be distributed over network of coupled computer systems so that the computer-readable code is stored and executed in a decentralized fashion.

While the present invention has been particularly shown and described with reference to embodiments thereof, it will be understood by one of ordinary skill in the art that various changes in form and detail may be made therein without departing from the spirit and scope of the present invention as defined by the following claims.

What is claimed is:

1. An opto-electric bus module comprising:
   an opto-electric interconnection unit connecting an opto-electric transmission unit and an opto-electric reception unit, in which an optical waveguide is formed, and having a lower surface in which at least one of a concave-shaped micro structure a convex-shaped micro structure is formed, connected to at least one first electric interconnection; and
   an optical bench in which
      a convex-shaped micro structure or a concave-shaped micro structure is formed in a position corresponding to at least one of the at least one concave-shaped or convex-shaped micro structure formed in the opto-electric interconnection unit,
      an opto-electric device for performing optical communication through the optical waveguide is mounted, and
      at least one second electric interconnection for electric connection to a semiconductor chip is formed.

2. The opto-electric bus module of claim 1, wherein the first electric interconnection is exposed on at least one convex or concave surface of a corresponding one of the at least one convex-shaped or concave-shaped micro structure formed in the opto-electric interconnection unit, and
   the second electric interconnection is formed on a convex or concave surface of a corresponding one of the convex-shaped or concave-shaped micro structure of the optical bench in a position corresponding to at least one of the at least one convex-shaped or concave-shaped micro structure of the opto-electric interconnection unit where the first electric interconnection is exposed.

3. The opto-electric bus module of claim 1, further comprising an alignment concave-shaped micro structure and an alignment convex-shaped micro structure having a predetermined position and height for aligning corresponding positions of the opto-electric interconnection unit and the optical bench.

4. The opto-electric bus module of claim 1, wherein the opto-electric device and the optical waveguide are abutted.

5. The opto-electric bus module of claim 1, wherein the at least one concave-shaped or convex-shaped microstructure of the opto-electric interconnection unit, and the convex-shaped micro structure or concave-shaped micro structure of the optical bench, are formed in respective contact edges of the opto-electric interconnection unit and the optical bench, such that respective concave-shaped or convex-shaped microstructures of the opto-electric interconnection unit and optical bench slide with respect to each other.

6. The opto-electric bus module of claim 1, wherein the optical bench comprises:
   a first optical bench where the opto-electric device is mounted on a 90°-inclined surface; and
   a second optical bench where the convex-shaped micro structure or the concave-shaped micro structure is formed in the position corresponding to the at least one of the at least one concave-shaped or convex-shaped micro structure formed in the opto-electric interconnection unit, and a concave-shaped micro structure into which the first optical bench is inserted is formed.

7. The opto-electric bus module of claim 1, wherein the opto-electric device is a light emitting device or a light receiving device and, if the opto-electric device is a light emitting device, the light emitting device is a vertical cavity surface emitting laser (VCSEL) that is a transverse magnetic (TM)-mode light emitting device.

8. The opto-electric bus module of claim 7, further comprising a 45° reflective mirror in an end portion of the opto-electric interconnection unit.

9. The opto-electric bus module of claim 8, further comprising a polarizer for adjusting polarization characteristics of a vertical optical signal under the 45° reflective mirror.

10. The opto-electric bus module of claim 1, wherein the opto-electric device is a light emitting device or a light receiving device, and, if the opto-electric device is a light emitting device, the light emitting device uses a laser diode that is a transverse magnetic (TM)-mode light emitting device.

11. The opto-electric bus module of claim 10, wherein when the light emitting device is a TE-mode light emitting device, and a polarizer is located between the TE-mode light emitting device and the opto-electric interconnection unit in order to convert TE-mode light into TM-mode light.

12. The opto-electric bus module of claim 1, wherein a concave-shaped micro structure of the opto-electric interconnection unit where the first electric interconnection is formed comprises a space for accommodating a thickness of a second interconnection line formed in a convex-shaped micro structure of the optical bench corresponding to the concave-shaped micro structure of the opto-electric interconnection unit comprising the space.

13. The opto-electric bus module of claim 1, wherein a cross section of at least one of the at least one convex-shaped or concave-shaped microstructure of the opto-electric interconnection unit, or of the convex-shaped micro structure or concave-shaped micro structure of the optical bench, is formed in a diamond shape.

14. The opto-electric bus module of claim 1, wherein the opto-electric interconnection unit comprises a clad of two layers, and a concave surface of a concave-shaped micro structure of the opto-electric interconnection unit contacts a surface where the two layers meet.

15. An opto-electric communication system comprising:
   an opto-electric interconnection unit connecting an opto-electric transmission unit and an opto-electric reception unit, in which an optical waveguide is formed, and having a lower surface in which at least one of a concave-shaped micro structure or a convex-shaped micro structure is formed, connected to at least one first electric interconnection; and
   an opto-electric transmission/reception unit comprising:
   an optical bench in which
      a convex-shaped micro structure or a concave-shaped micro structure is formed in a position corresponding to at least one of the at least one concave-shaped or convex-shaped micro structure formed in the opto-electric interconnection unit,
   an opto-electric device for performing optical communication through the optical waveguide is mounted;
   a second electric interconnection is formed on the optical bench and electrically connected with the first electric interconnection; and
   a semiconductor chip is connected to both the opto-electric device and the second electric interconnection.

16. The opto-electric communication system of claim 15, wherein the first electric interconnection is exposed on at least one convex or concave surface of a corresponding one of the at least one convex-shaped or concave-shaped micro structure formed in the opto-electric interconnection unit, and
   the second electric interconnection is formed on a convex or concave surface of a corresponding one of the convex-shaped or concave-shaped micro structure of the optical bench in a position corresponding to at least one of the at least one convex-shaped or concave-shaped micro structure of the opto-electric interconnection unit where the first electric interconnection is exposed.

17. The opto-electric communication system of claim 15, further comprising an alignment concave-shaped micro structure and an alignment convex-shaped micro structure having a predetermined position and height for aligning corresponding positions of the opto-electric interconnection unit and the optical bench.

18. A method of manufacturing an opto-electric interconnection unit, the method comprising:
   forming a lower clad by coating ultraviolet (UV) hardened polymer onto a substrate and hardening the substrate with UV rays, and forming an optical waveguide and an electric interconnection on the resulting upper clad;
   forming an upper clad by coating UV hardened polymer onto the lower clad, pressing an UV permeable mold having a convex-shaped micro structure formed therein onto the upper clad, and hardening the resulting upper clad with UV rays; and
   separating the mold from the upper clad.

19. A method of manufacturing an opto-electric interconnection unit, the method comprising:
   forming a lower clad by coating ultraviolet (UV) hardened polymer onto a substrate and hardening the substrate with UV rays, and forming an optical waveguide on the resulting upper clad;
   forming an upper clad by coating UV hardened polymer onto the lower clad, pressing an UV permeable mold having a concave-shaped micro structure formed therein onto the upper clad, and hardening the resulting upper clad with UV rays;
   separating the mold from the upper clad; and
   forming an electric interconnection on the upper clad.

* * * * *